US011295635B2

(12) United States Patent
Yoshino et al.

(10) Patent No.: US 11,295,635 B2
(45) Date of Patent: Apr. 5, 2022

(54) DATA PROCESSING SYSTEM AND DATA PROCESSING METHOD

(71) Applicant: Hitachi, Ltd., Tokyo (JP)

(72) Inventors: Masayuki Yoshino, Tokyo (JP); Hisayoshi Sato, Tokyo (JP); Ken Naganuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 659 days.

(21) Appl. No.: 15/759,532

(22) PCT Filed: Dec. 14, 2015

(86) PCT No.: PCT/JP2015/084910
§ 371 (c)(1),
(2) Date: Mar. 13, 2018

(87) PCT Pub. No.: WO2017/103970
PCT Pub. Date: Jun. 22, 2017

(65) Prior Publication Data
US 2019/0147770 A1  May 16, 2019

(51) Int. Cl.
*H04L 29/00* (2006.01)
*G09C 1/00* (2006.01)
(Continued)

(52) U.S. Cl.
CPC ............... *G09C 1/00* (2013.01); *G06F 16/00* (2019.01); *G06F 16/2246* (2019.01);
(Continued)

(58) Field of Classification Search
CPC ...... G09C 1/00; G06F 16/245; G06F 16/2246
(Continued)

(56) References Cited

U.S. PATENT DOCUMENTS 7,269,578 B2 * 9/2007 Sweeney ............. G06F 21/6245
705/74
2008/0183656 A1 * 7/2008 Perng ....................... G06F 16/20
(Continued)

FOREIGN PATENT DOCUMENTS

JP    2015-46030 A     3/2015
WO   2011/145401 A1   11/2011
WO   2015/063905 A1    5/2015

OTHER PUBLICATIONS

Kristen LeFevre, et al., "Incognito: Efficient Full-Domain K-Anonymity" Proceedings of the 2005 ACM SIGMOD international conference on Management Data, pp. 49-60.
(Continued)

*Primary Examiner* — Jeffrey C Pwu
*Assistant Examiner* — Michael D Anderson
(74) *Attorney, Agent, or Firm* — Mattingly & Malur, PC

(57) ABSTRACT

Provided is a data processing system having a processor and a storage apparatus coupled to the processor, wherein: the storage apparatus holds a plurality of encrypted data that are generated by encrypting a plurality of plain text data, and a plurality of encrypted queries for retrieving the plurality of encrypted data directly in an encrypted state; and the processor retrieves each of the encrypted data using each of the encrypted queries and thereby calculates the number of appearances of encrypted data that are retrieved using each of the encrypted queries, changes at least two of the plurality of encrypted data on the basis of the number of appearances of encrypted data that are retrieved using each of the encrypted queries so that predetermined anonymity is satisfied, and outputs a plurality of encrypted data.

16 Claims, 19 Drawing Sheets

(51) Int. Cl.
- *G06F 21/62* (2013.01)
- *G06F 16/00* (2019.01)
- *G06F 16/245* (2019.01)
- *G06F 16/22* (2019.01)
- *G06F 21/60* (2013.01)
- *G06F 21/78* (2013.01)
- *H04L 9/14* (2006.01)

(52) U.S. Cl.
CPC .......... *G06F 16/245* (2019.01); *G06F 21/602* (2013.01); *G06F 21/6227* (2013.01); *G06F 21/6254* (2013.01); *G06F 21/78* (2013.01); *H04L 9/14* (2013.01); *G06F 2221/2115* (2013.01)

(58) Field of Classification Search
USPC .......................................................... 713/193
See application file for complete search history.

(56) References Cited

U.S. PATENT DOCUMENTS

2012/0158734 A1* 6/2012 Chang .................... G06F 21/62
707/741
2013/0138698 A1  5/2013 Harada et al.

OTHER PUBLICATIONS

International Search Report of PCT/JP2015/084910 dated Mar. 1, 2016.
Extended European Search Report received in corresponding European Application No. 15910661.6 dated May 8, 2019.
Tai, C. et al., "k-Support Anonymity Based on Pseudo Taxonomy for Outsourcing of Frequent Itemset Mining", Proceedings of the 16th ACM SIGKDD International Conference on Knowledge Discovery and Data Mining, Jul. 25, 2010, pp. 473-482.

* cited by examiner

CORRESPONDENCE TABLE OF ATTRIBUTE 1  115A

| ENCRYPTED QUERY | ENCRYPTED DATA DEDICATED TO DECRYPTION PC |
|---|---|
| Q(a) | $E_k(a)$ |
| Q(b) | $E_k(b)$ |
| Q(c) | $E_k(c)$ |
| Q(d) | $E_k(d)$ |
| Q(e) | $E_k(e)$ |
| Q(f) | $E_k(f)$ |
| Q(bc) | $E_k(bc)$ |
| Q(de) | $E_k(de)$ |
| Q(abc) | $E_k(abc)$ |
| Q(def) | $E_k(def)$ |
| Q(*) | $E_k(*)$ |

*FIG.5D*

CORRESPONDENCE TABLE OF ATTRIBUTE 1         115B

| ENCRYPTED QUERY | ENCRYPTED DATA DEDICATED TO DECRYPTION PC (1) | ENCRYPTED DATA DEDICATED TO DECRYPTION PC (2) | ... |
|---|---|---|---|
| Q(a) | $E_{k1}(a)$ | $E_{k2}(a)$ | ... |
| Q(b) | $E_{k1}(b)$ | $E_{k2}(b)$ | ... |
| Q(c) | $E_{k1}(c)$ | $E_{k2}(c)$ | ... |
| Q(d) | $E_{k1}(d)$ | $E_{k2}(d)$ | ... |
| Q(e) | $E_{k1}(e)$ | $E_{k2}(e)$ | ... |
| Q(f) | $E_{k1}(f)$ | $E_{k2}(f)$ | ... |
| Q(bc) | $E_{k1}(bc)$ | $E_{k2}(bc)$ | ... |
| Q(de) | $E_{k1}(de)$ | $E_{k2}(de)$ | ... |
| Q(abc) | $E_{k1}(abc)$ | $E_{k2}(abc)$ | ... |
| Q(def) | $E_{k1}(def)$ | $E_{k2}(def)$ | ... |
| Q(*) | $E_{k1}(*)$ | $E_{k2}(*)$ | ... |

*FIG.5E*

FREQUENCIES OF APPEARANCES OF LEAF NODES

PROCESSING OF AGGREGATING FREQUENCIES OF
NODES BY MANAGEMENT SERVER

ATTRIBUTE 1 OF ENCRYPTED DATABASE    ↙1002

| E(a) | E(b) | E(c) | E(d) | E(e) | E(f) |
|---|---|---|---|---|---|
| $E_k(1)$ | $E_k(0)$ | $E_k(0)$ | $E_k(0)$ | $E_k(0)$ | $E_k(0)$ |
| $E_k(1)$ | $E_k(0)$ | $E_k(0)$ | $E_k(0)$ | $E_k(0)$ | $E_k(0)$ |
| . | . | . | . | . | . |
| . | . | . | . | . | . |
| . | . | . | . | . | . |
| $E_k(0)$ | $E_k(0)$ | $E_k(0)$ | $E_k(0)$ | $E_k(1)$ | $E_k(0)$ |
| $E_k(0)$ | $E_k(0)$ | $E_k(0)$ | $E_k(0)$ | $E_k(0)$ | $E_k(1)$ |

↓ AGGREGATION

| E(a) | E(b) | E(c) | E(d) | E(e) | E(f) |
|---|---|---|---|---|---|
| $E_k(4)$ | $E_k(3)$ | $E_k(1)$ | $E_k(2)$ | $E_k(6)$ | $E_k(7)$ |

↓ DECRYPTION

| E(a) | E(b) | E(c) | E(d) | E(e) | E(f) |
|---|---|---|---|---|---|
| 4 | 3 | 1 | 2 | 6 | 7 |

FIG.11

DATA PROCESSING SYSTEM AND DATA PROCESSING METHOD

BACKGROUND OF THE INVENTION

This invention relates to a technology of creating an anonymized database.

A technology of processing data containing sensitive information so that the processed data does not contain the sensitive information is called "anonymization technology", and has been discussed for many years. However, the related art is known to sometimes allow an attacker who has knowledge of unanonymized original data to identify the original data even after the data is anonymized.

In Kristen LeFevre, David J. DeWitt, Raghu Ramakrishnan, "Incognito: efficient full-domain K-anonymity", Proceedings of the 2005 ACM SIGMOD international conference on Management Data, pp. 49-60, in order to solve this problem, there is disclosed a technology of anonymizing a predetermined attribute in data so that there are always k or more records of the same value for the predetermined attribute. In this case, when k is equal to or larger than 2, the original data is not uniquely identified from the anonymized attribute.

In U.S. Pat. No. 7,269,578 B2, there is disclosed a system configured to output data anonymized so as to satisfy a specified anonymity requirement.

In US 2013/0138698 A1, regarding a technology of protecting personal information, there is disclosed provision of an anonymization device configured to automatically configure a generalization hierarchy tree of attribute values.

SUMMARY OF THE INVENTION

To achieve optimization of development costs and operational and maintenance costs of an information system, in recent years, attention has been given to a system configured to request processing of data on an information system called a "cloud system" provided by a third party organization without maintaining the information system by itself. In this case, data is required to be stored in the information system managed by the third party organization, and thus an encryption technology is being developed as an effective measure to prevent information leakage.

In the method disclosed in U.S. Pat. No. 7,269,578 B2, data is always required to be disclosed to an anonymization execution environment, which means that, when an anonymization execution environment managed by an external organization, for example, the cloud system is used, user data is disclosed to the cloud system and thus there is a risk of information leakage. This risk of information leakage prevents a user from using the cloud system for highly confidential data.

To solve the foregoing problem, a representative example of this invention provides a data processing system, comprising a first computer, the first computer comprising: a first processor; and a first storage apparatus coupled to the first processor, wherein the first storage apparatus is configured to hold: a plurality of pieces of encrypted data generated by encrypting a plurality of pieces of plaintext data; and a plurality of encrypted queries for retrieving the plurality of pieces of encrypted data without decryption, and wherein the first processor is configured to: retrieve each of the plurality of pieces of encrypted data through use of each of the plurality of encrypted queries, to thereby calculate a number of appearances of the each of the plurality of pieces of encrypted data retrieved through use of the each of the plurality of encrypted queries; change at least two of the plurality of pieces of encrypted data so as to satisfy a predetermined level of anonymity based on the number of appearances of the each of the plurality of pieces of encrypted data retrieved through use of the each of the plurality of encrypted queries; and output the plurality of pieces of encrypted data.

According to one embodiment of this invention, the user can entrust anonymization processing of data to an information system managed by a third party organization even when the data contains sensitive information.

BRIEF DESCRIPTION OF THE DRAWINGS

FIG. 5D is an explanatory diagram of a first example of a correspondence table between an encrypted query and encrypted data, which is generated by the registration PC in the first embodiment of this invention.

FIG. 5E is an explanatory diagram of a second example of the correspondence table between an encrypted query and encrypted data, which is generated by the registration PC in the first embodiment of this invention.

FIG. 11 is an explanatory diagram of processing of aggregating frequencies of nodes, which is executed by the management server in the modification example of the first embodiment of this invention.

DETAILED DESCRIPTION OF THE PREFERRED EMBODIMENTS

Figure 1:
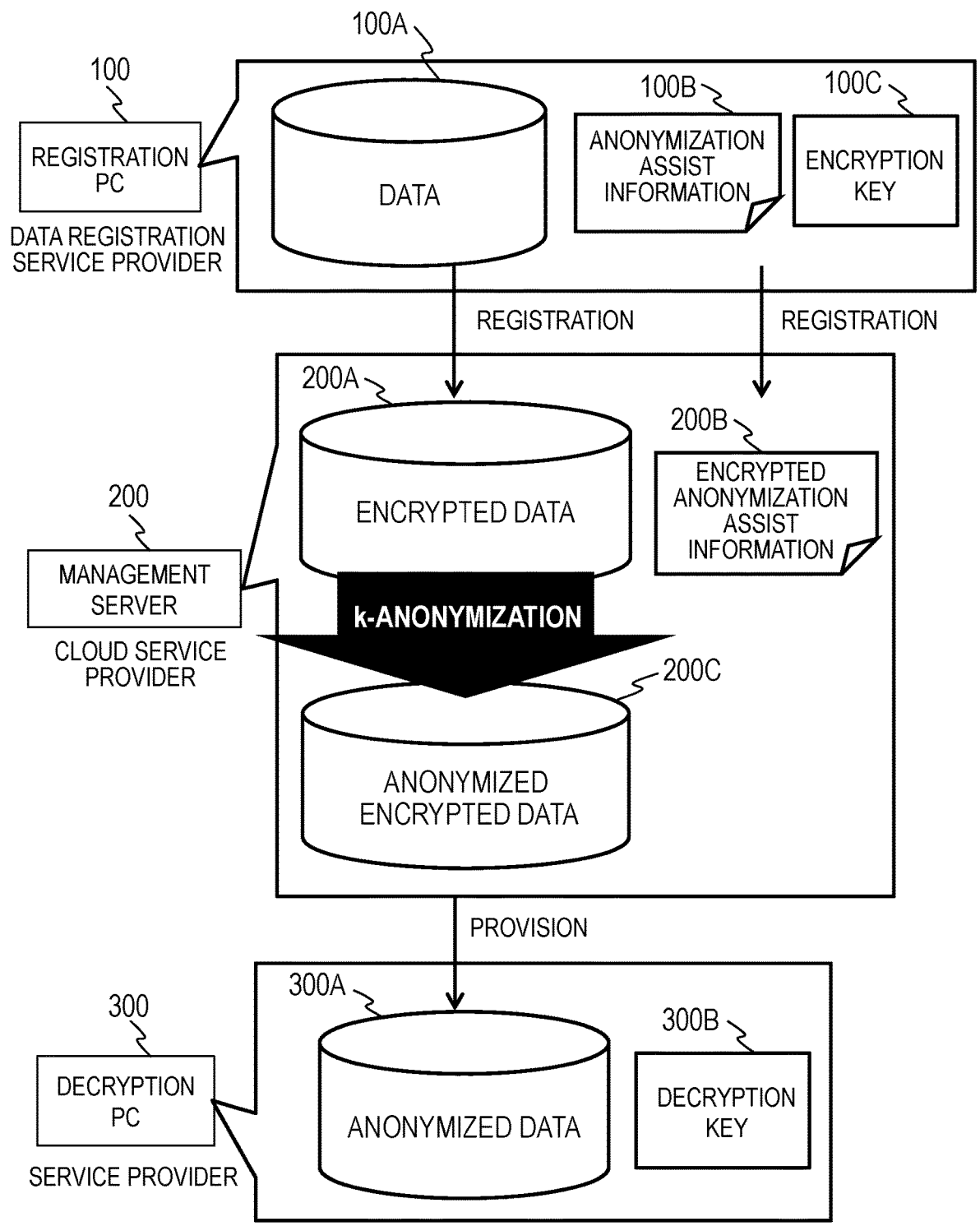
FIG. 1 is an explanatory diagram for illustrating an outline of a use case of a data processing system of a first embodiment of this invention.

In the following, a description is given in detail of embodiments of this invention with reference to the drawings. This invention is not limited to the embodiments. In the embodiments, the same component is denoted by the same reference symbol in principle, and a repetitive description thereof is omitted.

First, terms used in the embodiments of this invention are defined.

(1) Database

The database is a type of management mode of data. When plaintext is stored as data, the database is referred to as "plaintext database". Further, when cipher text is stored as data, the database is referred to as "encrypted database". When the database is simply referred to as "database", whether or not data is encrypted does not matter.

(2) Encryption key

The encryption key is a key to be used for encrypting data.

(3) Decryption key

The decryption key is a key to be used for decrypting data. In the case of common key cryptography, the encryption key and the decryption key are the same as each other.

(4) Plaintext data (or plaintext)

The plaintext data is data to be encrypted.

(5) Plaintext space

The plaintext space is a set of values that may be taken by plaintext. For example, when the plaintext space contains values of 0 or more and less than t, the plaintext may take any one of integers [0, 1, 2, . . . , t−1]

(6) Searchable encryption

The searchable encryption has a function of encrypting/decrypting data and a function of encrypting a query. The searchable encryption can compare encrypted data with an encrypted query while encryption of the encrypted data is maintained, to determine whether or not original data is equal to a value of the query. In one embodiment of this invention, this determination function outputs 0 or 1. The value of 0 means that the original data is equal to the value of the query, whereas the value of 1 means that the original data is not equal to the value of the query. Even searchable encryption that does not have a decryption function at the cryptographic primitive level can be combined with another cryptographic primitive to construct searchable encryption that has a decryption function.

(7) Anonymization assist parameter

The anonymization assist parameter is a general term for parameters to be used for k-anonymization. The anonymization assist parameter may contain, for example, a k-value, a k-anonymization algorithm, and an attribute to be anonymized (or column number or row number of encrypted database to be anonymized).

(8) Anonymization assist data

The anonymization assist data is data for representing a state of anonymization. The anonymization assist data may contain a score or other values based on, for example, an information amount after anonymization in addition to the k-value.

(9) Generalization hierarchy tree

The generalization hierarchy tree is data to be used for a procedure of re-encoding (anonymizing) data, which is generally defined for each attribute. As illustrated in a generalization hierarchy tree 112A of FIG. 5B described later, a generalization hierarchy tree is given to a single attribute (attribute 1 in example of FIG. 5B). Values (e.g., a, b, and ab) are labeled on nodes in the generalization hierarchy tree, and the nodes have a connection structure. Each node is given a height in the generalization hierarchy tree, and for example, in the generalization hierarchy tree 112A, a node {*} is at the highest position, followed by nodes {abc, def} and {bc, de}, and lastly, by nodes {a, b, c, d, e, f} (namely, at the lowest position). Of the nodes directly connected by a line, a node at the higher position is called "parent node", and a node at the lower position is called "child node". Further, a node that does not have a parent node is called "root node", and a node that does not have a child node is called "leaf node". The leaf node directly indicates an original value of data, and for example, the value {a, b, c, d, e, f} in the attribute 1 of a plane text database 111 of FIG. 4B described later is assigned as the label of a leaf node. A position at which the node height is the lowest is set as a layer 0, and as the position becomes higher by one level, the layer is increased by one level. For example, the generalization hierarchy tree 112A has four kinds of layers, namely, the layer 0, a layer 1, a layer 2, and a layer 3. In the anonymization technology disclosed in the first embodiment, the generalization hierarchy tree is used for a procedure of re-encoding (anonymizing) data. For example, in the generalization hierarchy tree 112A, values {a, b, c, d, e, f} of the plaintext space of data are enumerated at the layer 0. {bc}, which is a value obtained by re-encoding {b, c}, and {de}, which is a value obtained by re-encoding {d, e}, are at the layer 1. {abc}, which is a value obtained by re-encoding {a} and {bc}, and {def}, which is a value obtained by re-encoding {de, f}, are at the layer 2. A symbol {*}, which is a value obtained by re-encoding {abc, def}, is at the layer 3.

(10) Order preserving encryption

The order preserving encryption has a function of encrypting/decrypting data and a function of encrypting a query. The order preserving encryption can compare encrypted data with an encrypted query while encryption of the encrypted data is maintained, to compare magnitudes of original data and a value of the query. The function of encrypting data and the function of encrypting a query may be the same depending on the cryptographic primitive.

First Embodiment

FIG. 1 is an explanatory diagram for illustrating an outline of a use case of a data processing system of a first embodiment of this invention.

Figure 2:
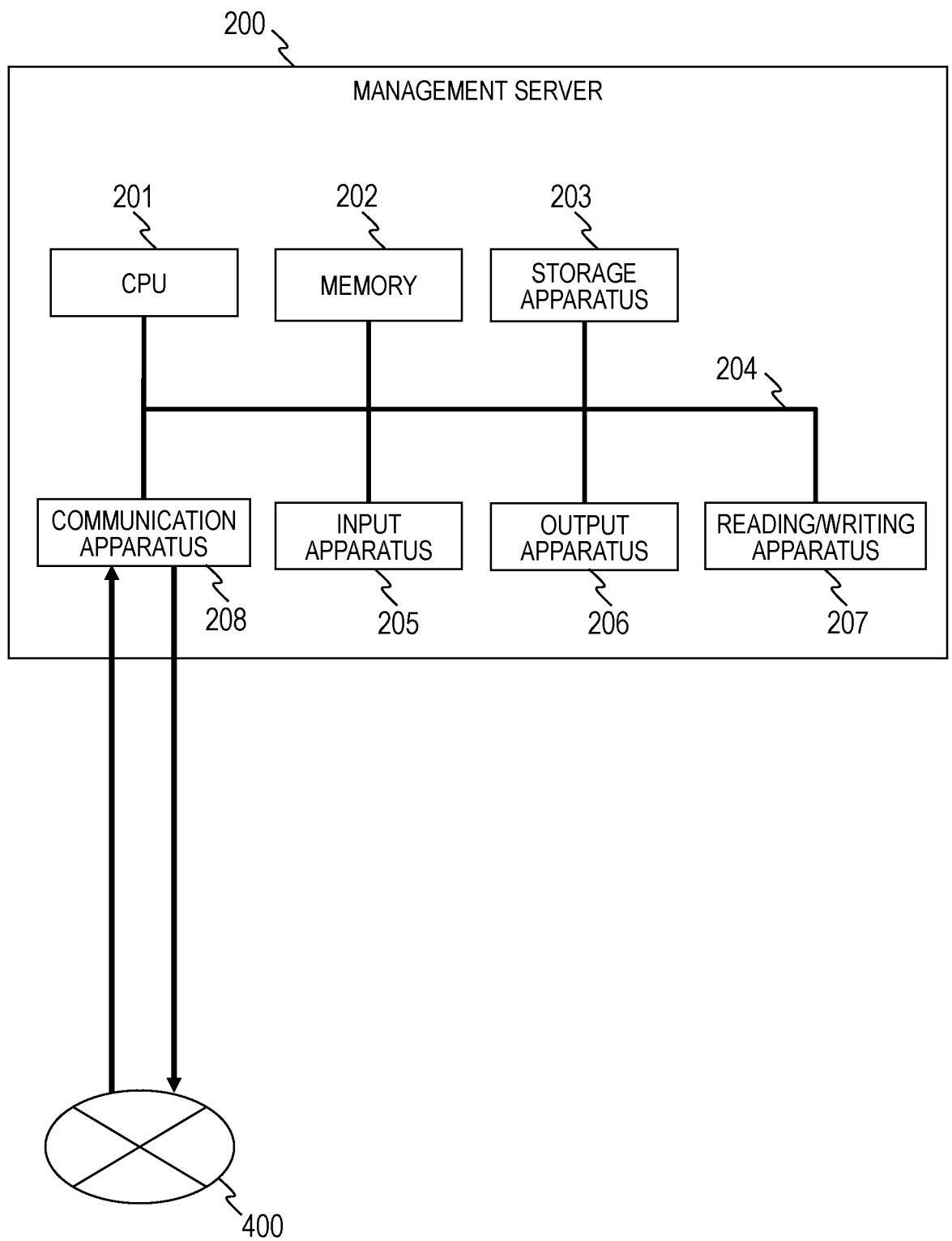
FIG. 2 is a block diagram for illustrating a hardware configuration of a management server in the first embodiment of this invention.

As illustrated in FIG. 1, the data processing system of the first embodiment includes a registration PC 100, a management server 200, and a decryption PC 300. As illustrated in FIG. 1, for example, the registration PC 100, the management server 200, and the decryption PC 300 may be owned by a data registration service provider, a cloud service provider, and a service provider, respectively. The registration PC 100 uses an encryption key 100C to encrypt data 100A, and registers encrypted data 200A with the management server 200 via a network 400, which is illustrated in FIG. 2. Further, the registration PC 100 encrypts anonymization assist information 100B to be used for anonymization, and registers the encrypted anonymization assist information 100B with the management server 200 via the network 400.

The management server 200 uses encrypted anonymization assist information 200B to create anonymized encrypted data 200C, which is obtained by anonymizing the encrypted data 200A, and provides the anonymized encrypted data 200C to the decryption PC 300 via the network 400. The decryption PC 300 uses a decryption key 300B to decrypt anonymized encrypted data 300C to obtain anonymized data 300A.

In the processing described above, the management server 200 can create anonymized data, and at the same time, content of data is not disclosed to the management server 200 due to encryption. Therefore, the data registration service provider (registration PC 100) can safely entrust anonymization processing of highly confidential data to the cloud system (management server 200).

FIG. 2 is a block diagram for illustrating a hardware configuration of the management server 200 in the first embodiment of this invention.

As illustrated in FIG. 2, the management server 200 is formed by an internal signal line 204 coupling a central processing unit (CPU) 201, a memory 202, a storage apparatus 203, an input apparatus 205, an output apparatus 206, a reading/writing apparatus 207, and a communication apparatus 208 to one another. A program is stored in the storage apparatus 203. The program is loaded into the memory 202 for execution by the CPU 201. In the following description, processing executed by the management server 200 is, in actuality, executed by the CPU 201 controlling the memory 202, the storage apparatus 203, the input apparatus 205, the output apparatus 206, the reading/writing apparatus 207, and the communication apparatus 208 as necessary.

The reading/writing apparatus 207 is an apparatus for reading or writing a replaceable storage medium such as a CR-R/CD-RW drive and a SD card reader/writer. The communication apparatus 208 is coupled to the network 400, and transmits/receives data to/from the registration PC 100 and the decryption PC 300 via the network 400.

Further, the hardware configurations of the registration PC 100 and the decryption PC 300 are similar to those of the management server 200, and thus a description thereof is omitted here. A program is stored in a storage apparatus of the registration PC 100, and the program is loaded into a memory of the registration PC 100 for execution by a CPU of the registration PC 100, to thereby implement processing of the registration PC 100. Similarly, a program is stored in a storage apparatus of the decryption PC 300, and the program is loaded into a memory of the decryption PC 300 for execution by a CPU of the decryption PC 300, to thereby implement processing of the decryption PC 300.

The program of the management server 200 may be input via the reading/writing apparatus 207, or input from the network 400 via the communication apparatus 208 to be stored into the storage apparatus 203, and after that, may be loaded into the memory 202 for execution by the CPU 201. The same holds true for programs of the registration PC 100 and the decryption PC 300.

Figure 3:
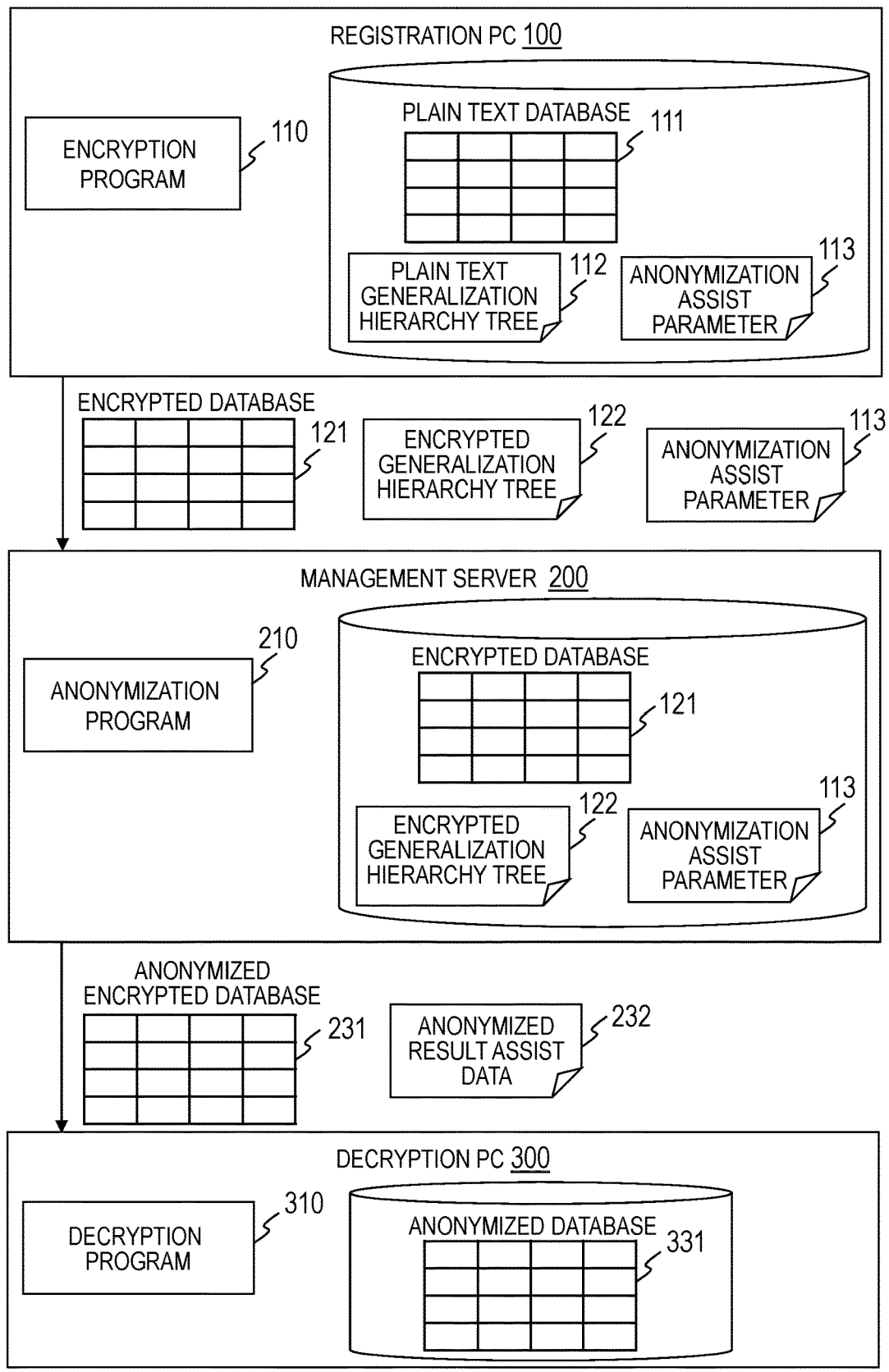
FIG. 3 is an explanatory diagram for illustrating an outline of data and programs stored in a registration PC, the management server, and a decryption PC and data to be transmitted/received via a network in the first embodiment of this invention.

FIG. 3 is an explanatory diagram for illustrating an outline of data and programs stored in the registration PC 100, the management server 200, and the decryption PC 300 and data to be transmitted/received via the network in the first embodiment of this invention.

The registration PC 100 holds, in the storage apparatus or in the memory, a plaintext database 111 storing plaintext data, a generalization hierarchy tree 112, which is plaintext information to be used for anonymization, and an anonymization assist parameter 113. Further, the storage apparatus or the memory of the registration PC 100 holds an encryption program 110 for encrypting the plaintext database 111 and the plaintext generalization hierarchy tree 112. The plaintext database 111 corresponds to the data 100A of FIG. 1, and the generalization hierarchy tree 112 and the anonymization assist parameter 113 correspond to the anonymization assist information 100B of FIG. 1.

An encrypted database 121 and an encrypted generalization hierarchy tree 122 are generated by the encryption program 110, which is held by the registration PC 100, encrypting the plaintext database 111 and the plaintext generalization hierarchy tree 112, and are provided to the management server 200 from the registration PC 100 via the network 400. Further, the anonymization assist parameter 113 is also provided to the management server 200 from the registration PC 100 via the network 400.

The management server 200 holds, in the storage apparatus 203 or in the memory 202, the encrypted database 121, the encrypted generalization hierarchy tree 122, which is information to be used for anonymization, and the anonymization assist parameter 113. Further, the storage apparatus 203 or the memory 202 holds an anonymization program 210 for anonymizing encrypted data by using the encrypted generalization hierarchy tree and the anonymization assist parameter. The encrypted database 121 corresponds to the encrypted data 200A of FIG. 1, and the encrypted generalization hierarchy tree 122 and the anonymization assist parameter 113 correspond to the encrypted anonymization assist information 200B of FIG. 1.

An anonymized encrypted database 231 is generated by the management server 200 anonymizing the encrypted database 121 using the anonymization program 210 held by the management server 200, and is provided to the decryption PC 300 from the management server 200 via the network 400. Further, an anonymized result assist data 232 is also provided to the decryption PC 300 from the management server 200 via the network 400. The anonymized encrypted database 231 corresponds to the anonymized encrypted data 200C of FIG. 1.

The decryption PC 300 holds, in the storage apparatus or the memory, a decryption program 310 for decrypting the anonymized encrypted database 231. The decryption PC 300 uses the decryption program 310 to decrypt the anonymized encrypted database 231, to thereby be able to hold an anonymized database 331 in the storage apparatus or in the memory. The anonymized database 331 corresponds to the anonymized data 300A of FIG. 1.

Figure 4A:
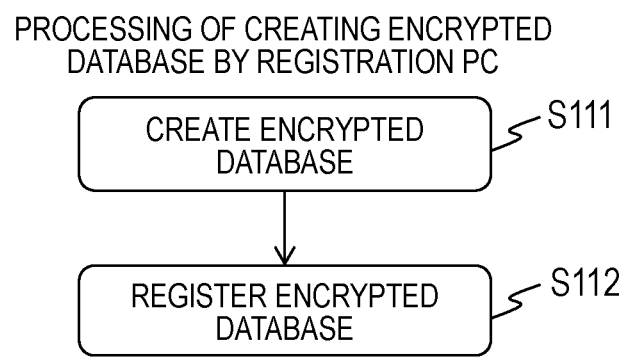
FIG. 4A is a flowchart for illustrating processing of creating and registering an encrypted database, which is executed by the registration PC in the first embodiment of this invention.
Figure 4B:
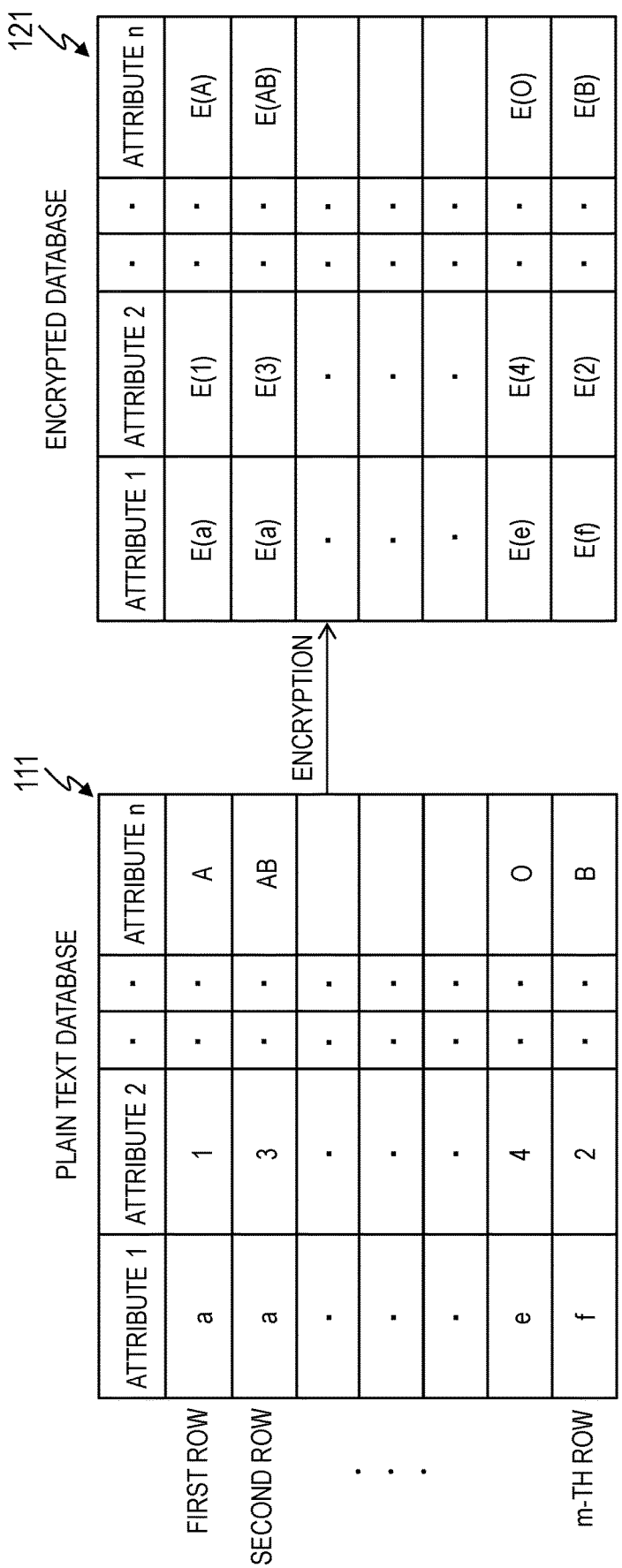
FIG. 4B is an explanatory diagram of the encrypted database created by the registration PC in the first embodiment of this invention.

Next, a description is given of a procedure of the registration PC 100 creating the encrypted database 121 for registration with the management server 200 with reference to FIG. 4A and FIG. 4B.

FIG. 4A is a flowchart for illustrating processing of creating and registering the encrypted database 121, which is executed by the registration PC 100 in the first embodiment of this invention.

FIG. 4B is an explanatory diagram of the encrypted database 121 created by the registration PC 100 in the first embodiment of this invention.

As shown in FIG. 4B, the plaintext database 111 contains a plurality of records (rows) for a plurality of attributes (columns). Each attribute takes any one of predetermined values, and it is assumed that an attribute 1 of the plaintext database 111 shown in FIG. 4B always takes any one of values {a, b, c, d, e, f}. Those plaintext attribute values are plaintext data of any format, such as numerical data like the age of a person or character string data like the address of a person.

The encrypted database 121 is generated by the registration PC 100 extracting data from the plaintext database 111 in units of cells and encrypting the data with a data encryption function of searchable encryption provided by the encryption program 110. The notation "$E_{(\ )}$" represents encryption, and for example, E(a) represents encrypted data of a value "a". Thus, the attribute 1 of the encrypted database 121 always takes any one of values {E(a), E(b), E(c), E(d), E(e), E(f)}.

The registration PC 100 extracts all the corresponding pieces of plaintext data from the plaintext database 111, uses the encryption key to create the encrypted database 121 (Step S111), and registers the encrypted database 121 with the management server 200 via the network 400 (Step S112).

Next, a description is given of a procedure of the registration PC 100 creating an encrypted generalization hierarchy tree, registering the encrypted generalization hierarchy tree with the management server 200 together with the anonymization assist parameter, and requesting the management server 200 for anonymization with reference to FIG. 5A to FIG. 5E.

Figure 5A:
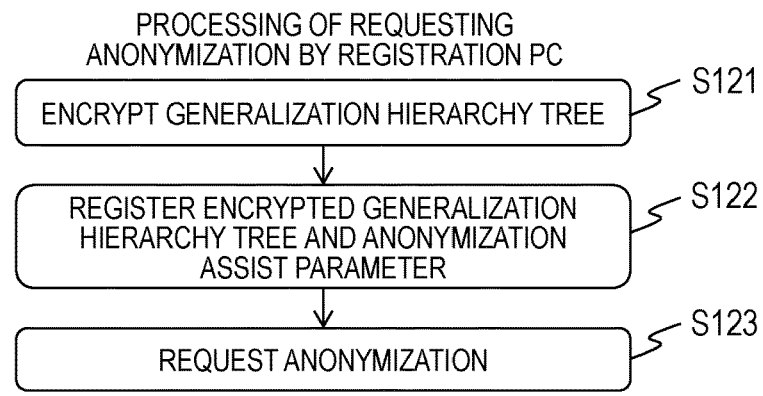
FIG. 5A is a flowchart for illustrating processing of requesting anonymization, which is executed by the registration PC in the first embodiment of this invention.

FIG. 5A is a flowchart for illustrating processing of requesting anonymization, which is executed by the registration PC 100 in the first embodiment of this invention.

Figure 5B:
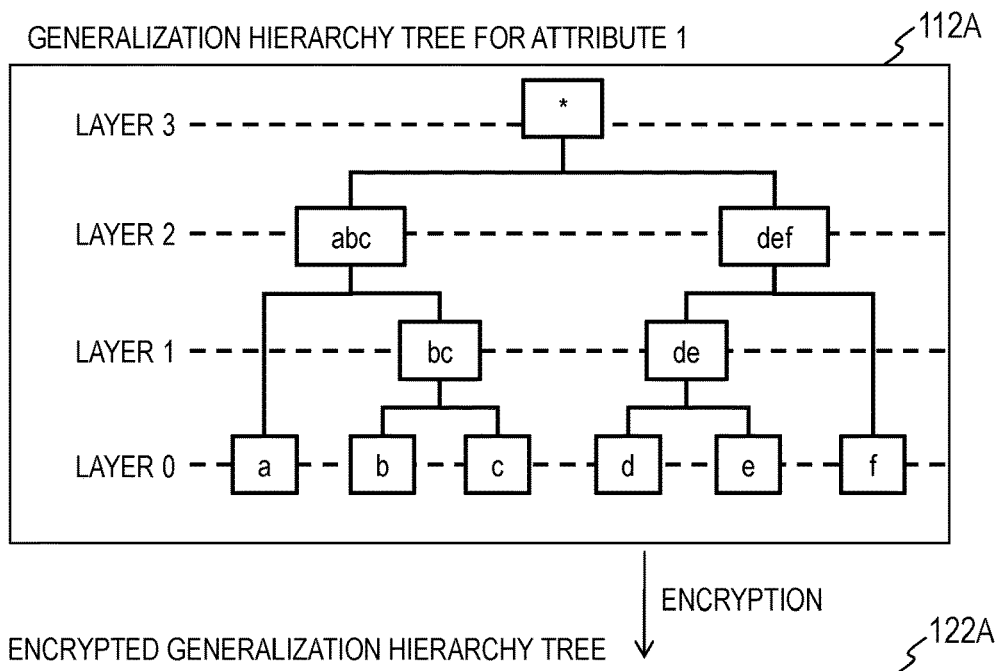
FIG. 5B is an explanatory diagram of encryption of the generalization hierarchy tree by the registration PC in the first embodiment of this invention.
Figure 5B:
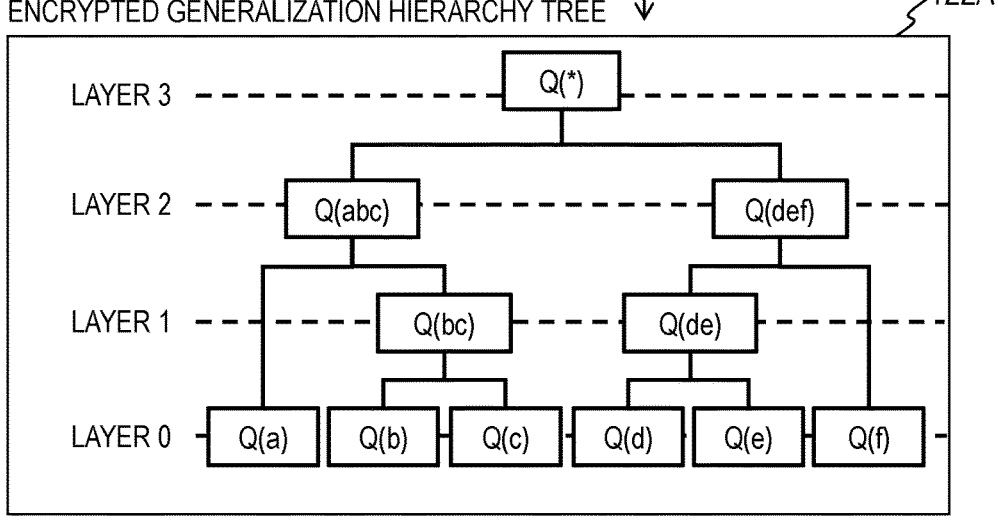

FIG. 5B is an explanatory diagram of encryption of the generalization hierarchy tree by the registration PC 100 in the first embodiment of this invention.

Figure 5C:
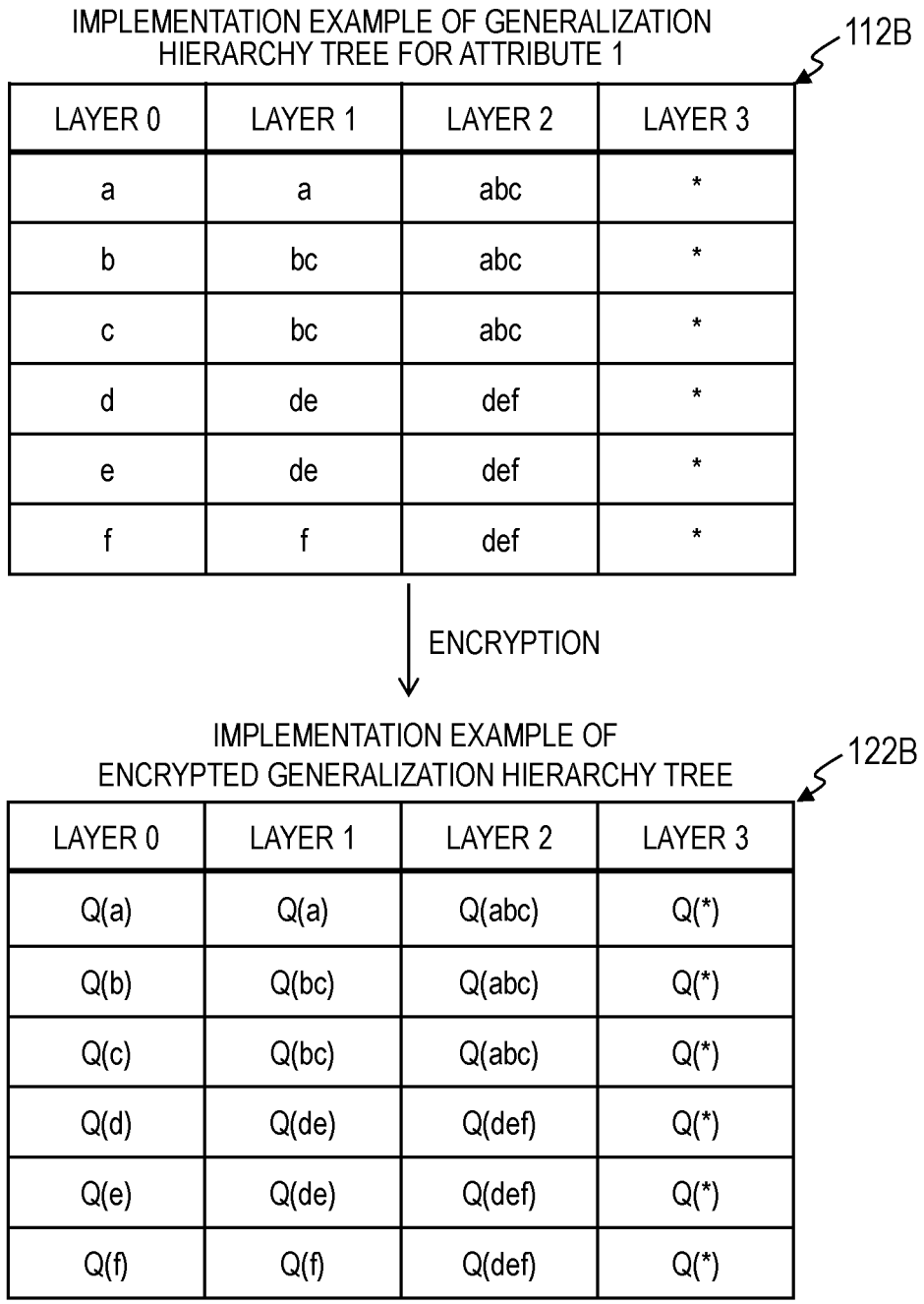
FIG. 5C is an explanatory diagram of exemplary implementation of the generalization hierarchy tree encrypted by the registration PC in the first embodiment of this invention.

FIG. 5C is an explanatory diagram of exemplary implementation of the generalization hierarchy tree encrypted by the registration PC 100 in the first embodiment of this invention.

FIG. 5D is an explanatory diagram of a first example of a correspondence table between an encrypted query and encrypted data, which is generated by the registration PC 100 in the first embodiment of this invention.

FIG. 5E is an explanatory diagram of a second example of the correspondence table between an encrypted query and encrypted data, which is generated by the registration PC 100 in the first embodiment of this invention.

The encrypted generalization hierarchy tree is obtained by encrypting a node of the generalization hierarchy tree with a query encryption function of searchable encryption. For example, as illustrated in FIG. 5B, when the generalization hierarchy tree 112A is encrypted, an encrypted generalization hierarchy tree 122A is obtained. The notation "$Q_{(\ )}$" represents an encrypted query, and for example, Q(a) represents an encrypted query of the value "a".

The management server 200 does not have a decryption key for decrypting encrypted data, and thus, for example, cannot decrypt the encrypted attribute value E(a) and know the attribute value "a". However, the management server 200 can use the encrypted query Q(a) to retrieve the encrypted data E(a) contained in the encrypted database 121 without decrypting the encrypted data E(a). In this manner, for example, the management server 200 can count the number of pieces of encrypted data E(a) contained in the encrypted database 121.

The anonymization assist parameter 113 contains a correspondence table for associating an encrypted query for retrieving encrypted data, which is obtained by encrypting each node of the plaintext generalization hierarchy tree, without decrypting the encrypted data, with encrypted data that can replace the encrypted data. This correspondence table associates each encrypted node of the generalization hierarchy tree with encrypted data that is obtained by encrypting one attribute value or a combination of a plurality of attribute values.

In FIG. 5D, a correspondence table 115A relating to the generalization hierarchy tree 112A is shown. The encrypted query and the encrypted data are not required to have a one-to-one relationship. For example, when there are a plurality of decryption PCs 300 that have different decryption keys (k1, k2, . . . ), as shown in a correspondence table 115B of FIG. 5E, one encrypted query may be associated with pieces of encrypted data for respective decryption keys. Further, the encrypted query and the encrypted data may have a many-to-many relationship.

The encrypted data for the decryption PC 300 held in the correspondence table is encrypted data for replacement, which is used to replace encrypted data retrieved through use of an encrypted query, and is encoded so that the encrypted data can be decoded by the decryption key 300B of the decryption PC 300. For example, when the decryption PC 300 holds a secret key of the public key cryptography as the decryption key 300B, the registration PC 100 may use its corresponding public key to generate encrypted data for replacement dedicated to the decryption PC 300, and register the encrypted data for replacement with the correspondence table 115A. Similarly, when there are a plurality of decryption PCs 300, the registration PC 100 may use public keys corresponding to their secret keys held by the respective plurality of decryption PCs 300 to generate pieces of encrypted data for replacement dedicated to the decryption PCs, and register those pieces of encrypted data for replacement with the correspondence table 115B. It is to be understood that an encryption key of the common key cryptography may be used to create encrypted data for replacement.

Alternatively, the registration PC 100 may use the same encryption key as an encryption key used at the time of creating the encrypted database in Step S111 to create encrypted data for replacement, and may transfer the decryption key used for decrypting the created encrypted data to the decryption PC 300 with a safe method. With this, it is possible to provide each decryption PC 300 with a desired anonymized database.

The method of implementing the generalization hierarchy tree is not limited to one, and as an example, an implementation example 112B of the generalization hierarchy tree 112A is shown in FIG. 5C. FIG. 5C is also an illustration of an implementation example 122B of an encrypted generalization hierarchy tree, which is generated by encrypting the generalization hierarchy tree 112A for each cell with the query encryption function when the generalization hierarchy tree 112A is implemented as the implementation example 112B.

The above-mentioned procedure is an example of encrypting the generalization hierarchy tree of one attribute (e.g., attribute 1). However, the registration PC 100 can also encrypt generalization hierarchy trees of other attributes (e.g., attribute 2, . . . , attribute n) with the query encryption function of the searchable encryption in the same manner.

The registration PC 100 uses the encryption key to encrypt the generalization hierarchy tree, to thereby create the encrypted generalization hierarchy tree (Step S121), and transmits the encrypted generalization hierarchy tree and the anonymization assist parameter to the management server 200 via the network for registration (Step S122). At this time, the registration PC 100 also generates encrypted data for replacement and correspondence tables 115A and 115B containing the data for transmission to and registration with the management server 200. Lastly, the registration PC 100 requests the management server 200 for anonymization (Step S123).

In Step S122, the registration PC 100 may not transmit the encrypted generalization hierarchy tree and anonymization assist parameter at the same time. For example, the registration PC 100 may register a generalization hierarchy tree encrypted in advance with the management server 200, and transmit the anonymization assist parameter at the time of requesting the management server 200 for anonymization.

The management server 200 can refer to the encrypted generalization hierarchy tree 122A and the correspondence table 115A, for example, to know the fact that the encrypted data E(b) retrieved through use of the encrypted query Q(b) can be replaced with any one of pieces of encrypted data for replacement $E_k(b)$, $E_k(bc)$ and $E_k(abc)$. Further, the management server 200 can refer to the encrypted generalization hierarchy tree 122A and the correspondence table 115A, for example, to know the fact that the level (e.g., frequency of appearances) of anonymity, which is achieved when the encrypted data E(b) is replaced with the encrypted data $E_k(bc)$ for replacement, can be calculated by a sum of the frequency of appearances of encrypted data retrieved through use of the encrypted query Q(b) and the frequency of appearances of encrypted data retrieved through use of the encrypted query Q(c).

As described above, the encrypted generalization hierarchy tree and correspondence table illustrated in FIG. 5B and FIG. 5E are just one implementation example of information for identifying encrypted data for replacement, which can replace encrypted data retrieved through use of each encrypted query, and information for specifying which encrypted query is to be used to calculate the frequency of appearances of a search result in order to calculate the level of anonymity achieved at the time of replacement. Those pieces of information may be implemented in another mode. For example, FIG. 5B to FIG. 5E represent the fact that the encrypted queries Q(b) and Q(c) are associated with the encrypted data $E_k(bc)$ for replacement via an encrypted query Q(bc), to thereby be able to replace both of the encrypted data retrieved through use of the encrypted query Q(b) and the encrypted data retrieved through use of the encrypted query Q(c) with the encrypted data $E_k(bc)$ for replacement. However, the encrypted queries Q(b) and Q(c) may be associated with the encrypted data $E_k(bc)$ for replacement without intervention of the encrypted query Q(bc) to represent that fact.

Figure 6:
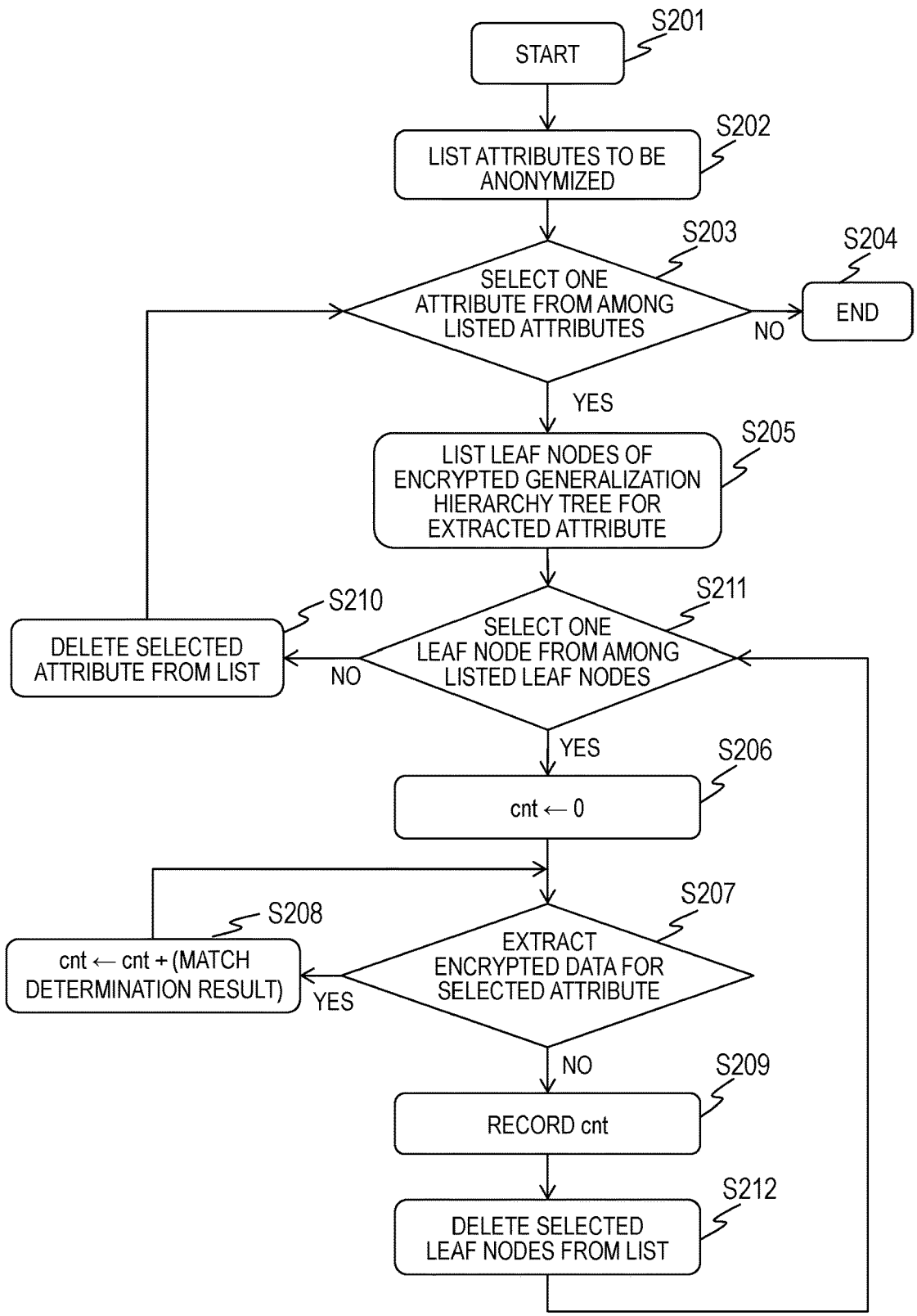
FIG. 6 is a flowchart for illustrating processing of aggregating frequencies of appearances of encrypted data having the same value as that of a leaf node using the encrypted generalization hierarchy tree, which is executed by the management server in the first embodiment of this invention.

FIG. 6 is a flowchart for illustrating processing of aggregating frequencies of appearances of encrypted data having the same value as that of a leaf node using the encrypted generalization hierarchy tree, which is executed by the management server 200 in the first embodiment of this invention.

The management server 200 reads the anonymization assist parameter 113, extracts all the attributes to be anonymized from the encrypted database 121, and lists the extracted attributes (Step S202).

Next, the management server 200 selects one attribute from among the attributes to be anonymized listed in Step S201 (Step S203). When there is no attribute left, the management server 200 ends the processing (Step S204). In Step S203, when any one of attributes is selected, the management server 200 extracts all the leaf nodes of the encrypted generalization hierarchy tree for the selected attribute, and lists the extracted leaf nodes (Step S205). Encrypted queries are registered with the leaf nodes.

Next, the management server 200 selects one leaf node from among the listed leaf nodes (Step S211). When there is no leaf node left, the processing proceeds to Step S210. The management server 200 selects one leaf node from among the listed leaf nodes, and then sets a variable cnt for aggregating the frequency to 0 (Step S206).

Next, the management server 200 extracts encrypted data for the selected attribute (Step S207). When the encrypted data is extracted, the management server 200 inputs the extracted encrypted data and the encrypted query (leaf node) into a determination function of the searchable encryption, and adds 0, which is output to represent a mismatch between the encrypted data and the encrypted query, or 1, which is output to represent a match between the encrypted data and the encrypted query, to the variable cnt (Step S208). With this operation, the number of pieces of encrypted data matching the leaf node is aggregated into the variable cnt. When there is no encrypted data to be newly extracted, the management server 200 registers the variable cnt at that time as the number of appearances of the leaf node for the selected attribute (Step S209).

Next, the management server 200 deletes the leaf node selected in Step S211 from the list created in Step S205 (Step S212), and the processing returns to Step S211.

The management server 200 deletes the attribute selected in Step S203 from the list created in Step S202 (Step S210).

Through the processing of FIG. 6, the number of appearances of the leaf node of the encrypted generalization hierarchy tree (or frequency of appearances calculated based on number of appearances) for all the attributed to be anonymized is obtained.

Figure 7A:
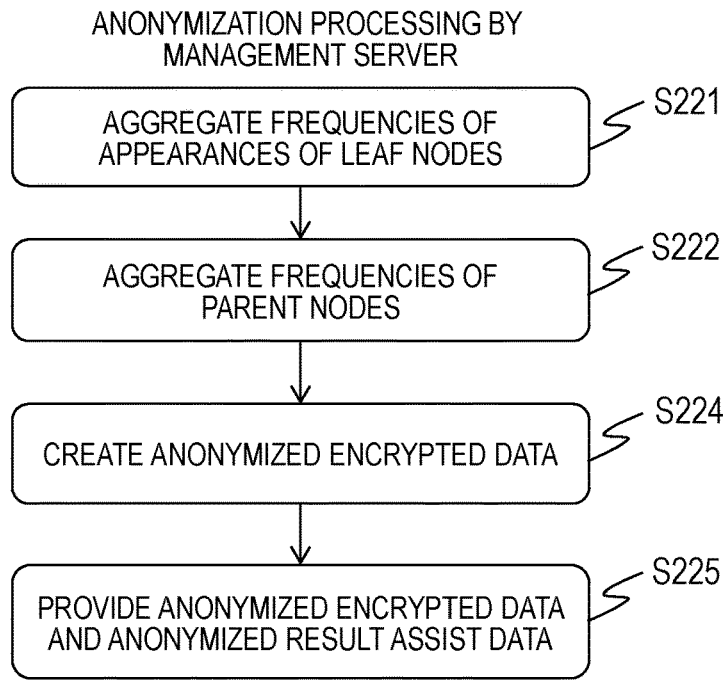
FIG. 7A is a flowchart for illustrating the anonymization processing, which is executed by the management server in the first embodiment of this invention.
Figure 7B:
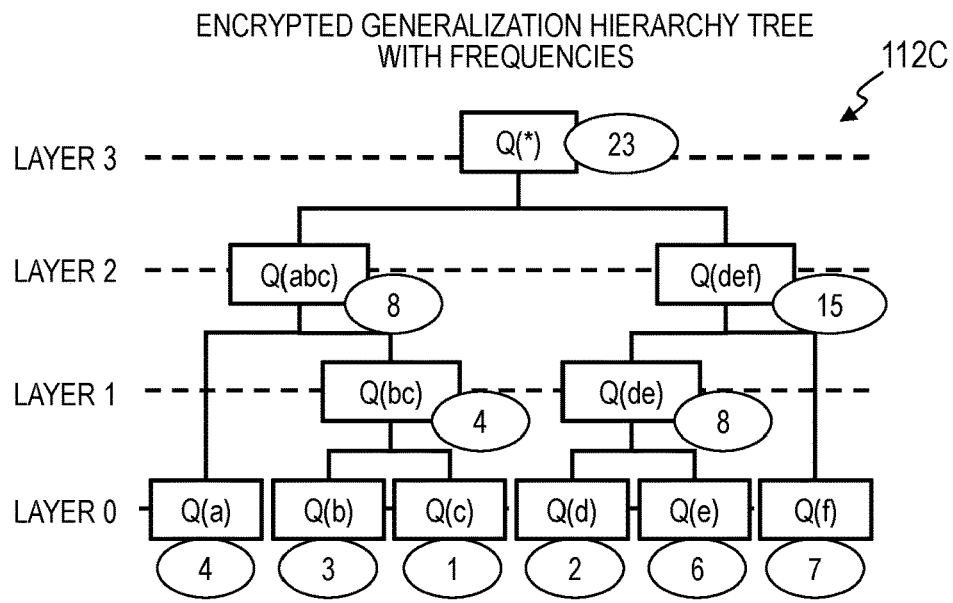
FIG. 7B is an explanatory diagram of an anonymized generalization hierarchy tree with frequencies, which is generated by the management server in the first embodiment of this invention.
Figure 7C:
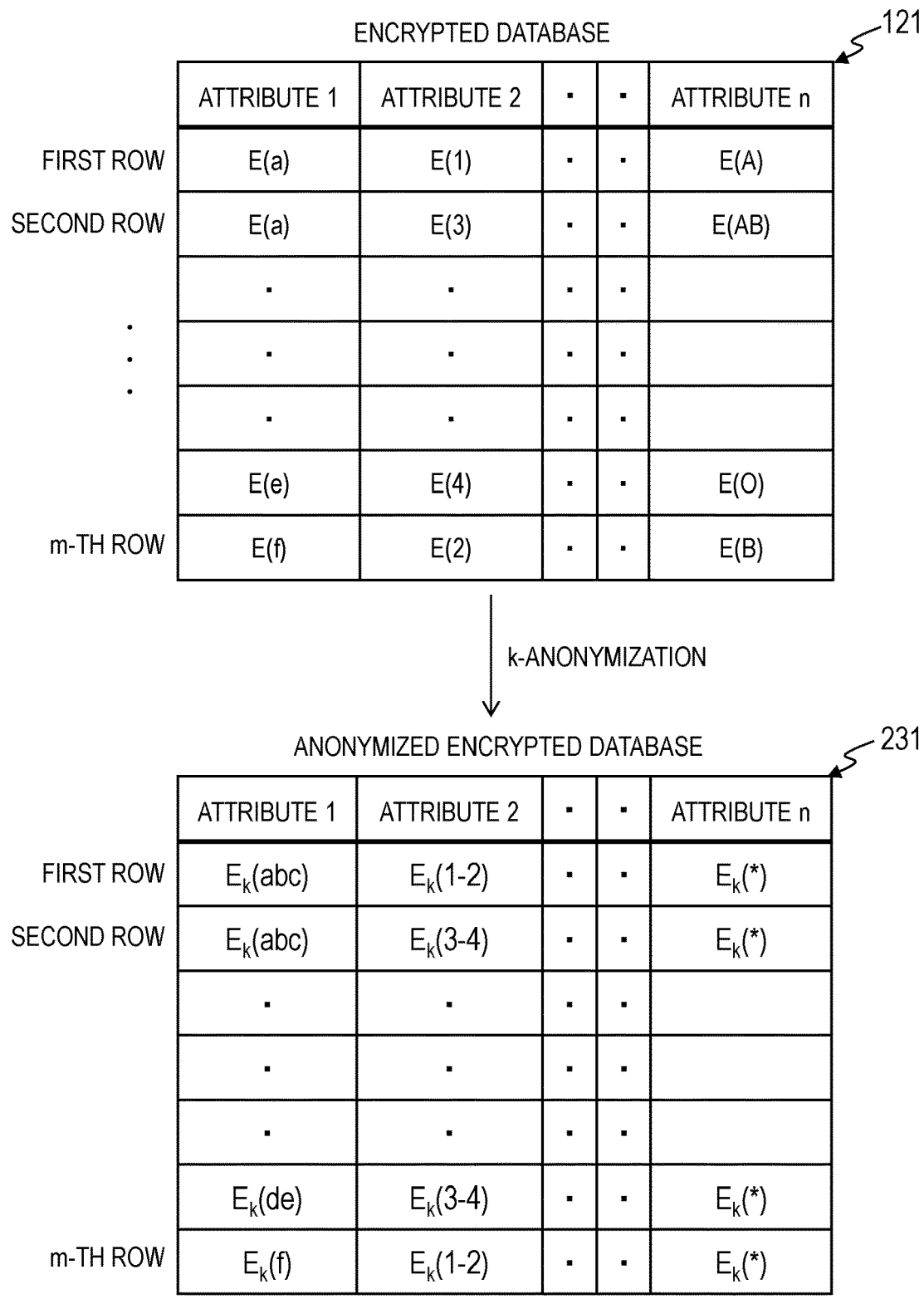
FIG. 7C is an explanatory diagram of an anonymized encrypted database, which is generated by the management server in the first embodiment of this invention.

Now, with reference to FIG. 7A to FIG. 7C, a description is given of a procedure of the management server 200 creating an anonymized encrypted database, which is obtained by anonymizing the encrypted database, and providing the decryption PC with the anonymized encrypted database.

FIG. 7A is a flowchart for illustrating the anonymization processing, which is executed by the management server 200 in the first embodiment of this invention.

FIG. 7B is an explanatory diagram of an anonymized generalization hierarchy tree with frequencies, which is generated by the management server 200 in the first embodiment of this invention.

FIG. 7C is an explanatory diagram of an anonymized encrypted database, which is generated by the management server 200 in the first embodiment of this invention.

The management server 200 follows the processing flow of FIG. 6 to store the frequency of appearances of the leaf node of the encrypted generalization hierarchy tree for all the attributes to be anonymized (Step S221). In FIG. 7B, there is illustrated an example of an encrypted generalization hierarchy tree 112C with frequencies generated by assigning the encrypted generalization hierarchy tree 122A illustrated in FIG. 5B with frequencies of appearances. In this example, among the leaf nodes of the generalization hierarchy tree, a node labeled with the encrypted query Q(a) (hereinafter simply referred to as "node Q(a)", and the same holds true for nodes corresponding to the other encrypted queries), a node Q(b), a node Q(c), a node Q(d), a node Q(e), and a node Q(f) are assigned with the frequencies of appearances of 4, 3, 1, 2, 6, and 7, respectively. In this example, the number of appearances is treated as the frequency of appearances.

Next, the management server 200 uses the frequencies of appearances of leaf nodes to assign the total sum of frequencies of appearances of child nodes to the frequency of appearances of a parent node (Step S222). For example, in the encrypted generalization hierarchy tree 112C with frequencies, Q(bc), which is the parent node of Q(b) with the frequency of appearances of 3 and Q(c) with the frequency of appearances of 1, is assigned with 4 being a sum of 3 and 1. Similarly, the management server 200 assigns all the nodes with frequencies of appearances.

Further, in Step S222, the management server 200 determines a combination of nodes satisfying k-anonymity based on the frequencies of appearances of nodes. A related-art method of determining a node may be employed, and for example, the technology described in U.S. Pat. No. 7,269,578 B2 or Kristen LeFevre, David J. DeWitt, Raghu Ramakrishnan, "Incognito: efficient full-domain K-anonymity", Proceedings of the 2005 ACM SIGMOD international conference on Management Data, pp. 49-60 can be used to determine nodes satisfying k-anonymity.

For example, when the encrypted generalization hierarchy tree 112C with frequencies illustrated in FIG. 7B is obtained and the k-value is 7, frequencies of appearances of the nodes Q(a), Q(b), and Q(c) are smaller than 7, which means that k-anonymity is not satisfied. Further, the node Q(bc), which is the parent node of the nodes Q(b) and Q(c), has a frequency of appearances smaller than 7. However, a node Q(abc), which is the parent node of the nodes Q(a) and Q(bc), has a frequency of appearances of 7 or more, and thus is determined as a node satisfying k-anonymity. Similarly, a Q(de), which is the parent node of the nodes Q(d) and Q(e), and the node Q(f) have frequencies of appearances of 7 or more, and thus are determined as nodes satisfying k-anonymity.

Next, the management server 200 replaces the determined node with the value of a leaf node, and then, uses the correspondence table 115A or 115B to replace an original value of encrypted data with a value of encrypted data corresponding to the replaced value of the leaf node, to thereby create the anonymized encrypted database 231 from the encrypted database 121 (Step S224).

For example, when Q(abc), Q(de), and Q(f) are determined as nodes satisfying k-anonymity in the encrypted generalization hierarchy tree 112C of FIG. 7B, the node Q(abc) satisfying k-anonymity, which is a higher-layer node of the Q(a), is determined to replace the encrypted query Q(a) used for retrieving the encrypted attribute value E(a) of the attribute 1 of the encrypted database 121, and thus the encrypted attribute value E(a) is replaced with the encrypted data $E_k$(abc) corresponding to Q(abc) through use of the correspondence table 115A.

Similarly, both of the pieces of encrypted data E(b) and E(c), which are retrieved by the encrypted queries Q(b) and Q(c), are replaced with the encrypted data $E_k$(abc) corresponding to Q(abc). Further, both of the pieces of encrypted data E(d) and E(e), which are retrieved by the encrypted queries Q(d) and Q(e), are replaced with the encrypted data $E_k$(de) corresponding to the node Q(de). Further, the encrypted data E(f) retrieved by the encrypted query Q(f) is replaced with the encrypted data $E_k$(f) corresponding to node Q(f).

As a result, the attribute 1 of the encrypted database 121 is replaced with that of the anonymized encrypted database 231 of FIG. 7C in the end. The management server 200 creates the anonymized result assist data 232, and transmits the anonymized result assist data 232 to the decryption PC via the network together with the anonymized encrypted database 231 (Step S225).

When the correspondence table 115B shown in FIG. 5E is prepared and information for indicating to which decryption PC 300 anonymized data is to be created is input to the management server 200, the management server 200 replaces the retrieved encrypted data with encrypted data for replacement corresponding to the indicated decryption PC 300 (Step S224).

Further, when the management server 200 executes anonymization of the encrypted database, which decryption PC 300 is to use the anonymized database may not be clear. In this case, in the processing described above, instead of replacing original encrypted data with encrypted data for replacement, the management server 200 may replace the original encrypted data with the corresponding encrypted query. After that, when the decryption PC 300 that uses the anonymized database is clear and the management server 200 has obtained a correspondence table containing a set of pieces of encrypted data for replacement dedicated to the decryption PC 300, the management server 200 may replace each encrypted query with the encrypted data for replacement dedicated to the decryption PC 300 and corresponding to the encrypted query.

The decryption PC 300 receives the anonymized encrypted database 231 and the anonymized result assist data 232 from the management server 200. Further, the decryption PC 300 uses the decryption key 300B to decrypt the anonymized encrypted database 231, and creates the anonymized database 331 for storage into the storage apparatus.

Through the processing described above, in the first embodiment, the registration PC 100 can request the management server 200 for anonymization processing and provide the decryption PC 300 with the anonymized database while keeping confidentiality of data and without disclosing the plaintext database to the management server 200.

In the use case of the first embodiment, as illustrated in FIG. 1, the encryption key held by the registration PC and the decryption key held by the decryption PC are different. However, the same key may be used for encryption and decryption. In this case, encrypted data, which is encrypted with the same encryption key as that used by the registration PC 100 to generate encrypted data for the decryption PC, is registered with, for example, the correspondence table 115A. Further, the management server 200 is not required to replace encrypted data, which already satisfies a certain level of anonymity before anonymization processing and is not required to be replaced with encrypted data assigned with other attribute values, with encrypted data for replacement.

Further, in the use case in the first embodiment, as illustrated in FIG. 1, the registration PC 100 and the decryption PC 300 are assumed to be operated by different computers of different operators. However, both of the registration PC 100 and the decryption PC 300 may be operated by the same computer of the same operator.

Further, in description of the use case in the first embodiment, as illustrated in FIG. 1, one registration PC 100, one management server 200, and one decryption PC 300 are operated. However, this invention is not limited by the number of computers. In other words, the plurality of registration PCs 100, the plurality of management servers 200, and the plurality of decryption PCs 300 may be adopted. In this case, different encryption keys may be held by the respective registration PCs 100, or by respective groups of the registration PCs 100. Similarly, different decryption keys may be held by the respective decryption PCs 300, or by respective groups of the decryption PCs 300. Further, the management server 200 may hold a key for a particular use, which is capable of handling pieces of encrypted data encrypted by different encryption keys with each other and aggregating the frequency.

Further, in the encrypted database 121 in the first embodiment, as shown in FIG. 4B, information for identifying an attribute of, for example, "attribute 1" is not encrypted. However, the configuration may be changed so that information for identifying the attribute is also encrypted. In this case, in Step S111, the registration PC 100 encrypts information for identifying the attribute using the data encryption function of the searchable encryption, and in Step S121, uses the query encryption function of the searchable encryption to encrypt a query for retrieving the encrypted attribute. After that, in Step S205, the management server 200 uses the determination function of the searchable encryption to extract the encrypted generalization hierarchy tree corresponding to the extracted attribute. Through this change of processing, the registration PC 100 can hide the information for identifying the attribute from the management server as well as attribute value data contained in the plaintext database 111.

Further, in the first embodiment, the data encryption function of the searchable encryption is used to create the encrypted database, the query encryption function of the searchable encryption is used to create the encrypted generalization hierarchy tree, and the determination function of the searchable encryption is used to create the encrypted generalization hierarchy tree with frequencies. However, this is only an example, and an encryption method different from that of the searchable encryption may also be used to implement one embodiment of this invention. For example, the order preserving encryption has a data encryption function, a query encryption function, and a determination function similarly to the searchable encryption, and thus the first embodiment may be modified so as to: use the data encryption function of the order preserving encryption to create an encrypted database; use the query encryption function of the order preserving encryption to create the encrypted generalization hierarchy tree; and use the determination function of the order preserving encryption to create an encrypted generalization hierarchy tree with frequencies. In this case, the order preserving encryption preserves an order relationship between numerical values, and thus, can finally create an anonymized database with preserved orders.

Further, in the first embodiment, comparable encryption capable of aggregating numerical values may be used. Similarly to the searchable encryption, the comparable encryption holds the data encryption function and the query encryption function, and in addition, can perform aggregation and comparison without decryption. Thus, through encryption by the comparable encryption, it is possible to find a node satisfying k-anonymity while keeping the frequency of appearances of the node encrypted.

Further, in one embodiment of this invention, encryption that is capable of aggregating numerical values and decrypting only the result of this numerical aggregation may be used. At this time, the correspondence relationship (determination result) between nodes and encrypted data is not required to be notified to the server, and thus a node satisfying k-anonymity can be found more safely. Now, a description is given of this modification example of the first embodiment to which such encryption is applied with reference to FIG. 10 and FIG. 11.

Figure 10:
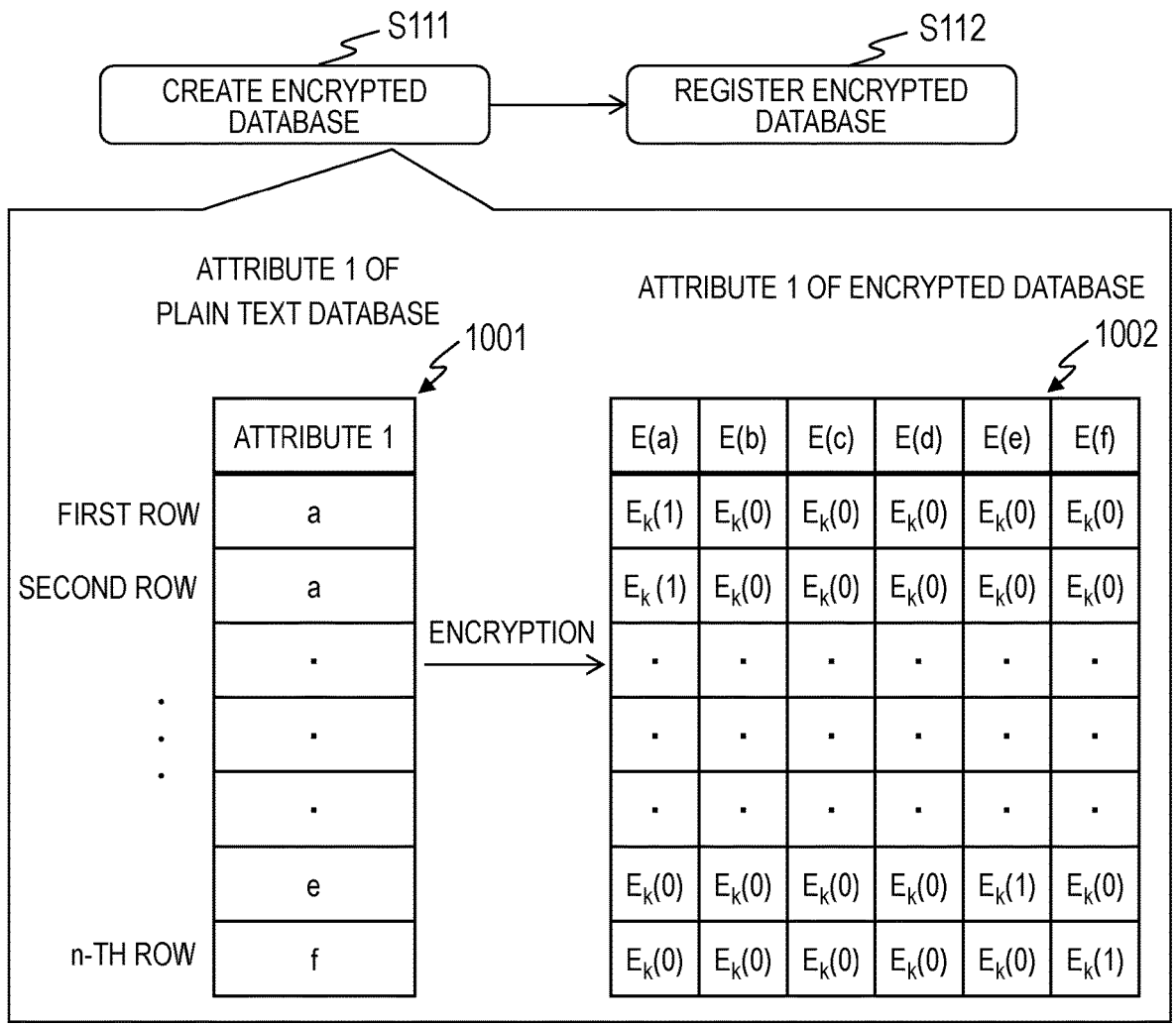
FIG. 10 is an explanatory diagram of processing of creating and registering the encrypted database, which is executed by the registration PC in a modification example of the first embodiment of this invention.

FIG. 10 is an explanatory diagram of processing of creating and registering the encrypted database 121, which is executed by the registration PC 100 in a modification example of the first embodiment of this invention.

FIG. 11 is an explanatory diagram of processing of aggregating frequencies of nodes, which is executed by the management server 200 in the modification example of the first embodiment of this invention.

For example, as shown in a table 1001 of FIG. 10, when the attribute 1 of the plaintext database takes any one of values {a, b, c, d, e, f}, the encrypted database (table 1002) fills values that may be taken by the plaintext attribute 1 into columns to create an encrypted database (table 1002) whose row corresponds to each value of the attribute 1 contained in the plaintext database. In this table 1002, the attribute value corresponding to each row always takes any one of "a" to "f", and a value obtained by encrypting 1 is held by a row corresponding to the attribute value of each row, and a value obtained by encrypting 0 is held by the other rows. For example, the value of the attribute 1 of the first row of the plaintext database is "a", and thus a value (e.g., $E_k(1)$) obtained by encrypting 1 is held by a column corresponding to the value "a", and a value (e.g., $E_k(0)$) obtained by encrypting 0 is held by the other rows. Further, values (e.g., E(a) to E(f) obtained by encrypting the values "a" to "f") obtained by encrypting values that may be taken by the attribute 1 and correspond to rows of the 0th column of the table 1002 are held by those rows.

This encryption enables aggregation of frequencies. The notation "$E_{k(\ )}$" means encryption capable of decrypting only the aggregation result with a key k. For example, the first row of the table 1002 takes $E_k(1)$ at the first column and takes $E_k(0)$ at the other columns. Thus, this means that the encrypted attribute value corresponding to the first row takes E(a), which is described at the 0th row of the first column. Similarly, the n-th row takes E(1) only at the 6th column and takes E(0) at the other columns. Thus, this means that the encrypted attribute value corresponding to the n-th row takes E(f), which is described at the 0th row of the sixth column. All those values are encrypted, and the management server 200 cannot distinguish those values from random numbers.

The registration PC 100 extracts all the relevant pieces of plaintext data from the plaintext database, uses the encryption key to create the encrypted database by the above-mentioned technique (Step S111), and registers the created encrypted database with the management server 200 via the network (Step S112). Further, in the processing of aggregating leaf nodes by the management server 200 (Step S221), as illustrated in FIG. 11, the encrypted data is aggregated for each column and the result is decrypted, to thereby obtain the frequencies of appearances of leaf nodes of the encrypted generalization hierarchy tree.

Further, in the use case in the first embodiment, as illustrated in, for example, FIG. 1, the plaintext database and the encrypted database are prepared. However, the encrypted data may be present in a part of the plaintext database, or the plaintext data may be present in a part of the encrypted database.

Further, a case of using, for example, the correspondence table 115A or 115B is used as an anonymization parameter in one embodiment of this invention. However, processing relating to the correspondence table can be omitted by giving a decryption function to the encrypted query of the searchable encryption. At this time, in Step S224, the management server 200 replaces the selected node with the value of a leaf node, and replaces the value of the leaf node after replacement with the original value of the encrypted database, to thereby create an anonymized encrypted database based on the encrypted database.

Further, processing may be modified so that the management server 200 creates a correspondence table by itself without transmitting the correspondence table from the registration PC 100 to the management server 200.

Second Embodiment

In the first embodiment, the encrypted generalization hierarchy tree is assumed to be given to the management server 200 by the registration PC 100. However, the registration PC 100 may not hold the generalization hierarchy tree, or may not wish to give the generalization hierarchy tree held by itself to the management server 200. Further, the management server 200 may wish to use a generalization hierarchy tree different from the given encrypted generalization hierarchy tree for anonymization. In view of this, in a second embodiment of this invention, a description is given of a method of anonymization processing in a case where the registration PC 100 does not give the encrypted generalization hierarchy tree to the management server 200, but gives data for creation of the generalization hierarchy tree. Except for differences described below, respective components of a system of the second embodiment have the same functions as those of components with the same reference symbols in the first embodiment illustrated in FIG. 1 to FIG. 7C, and thus a description thereof is omitted here.

Figure 8A:
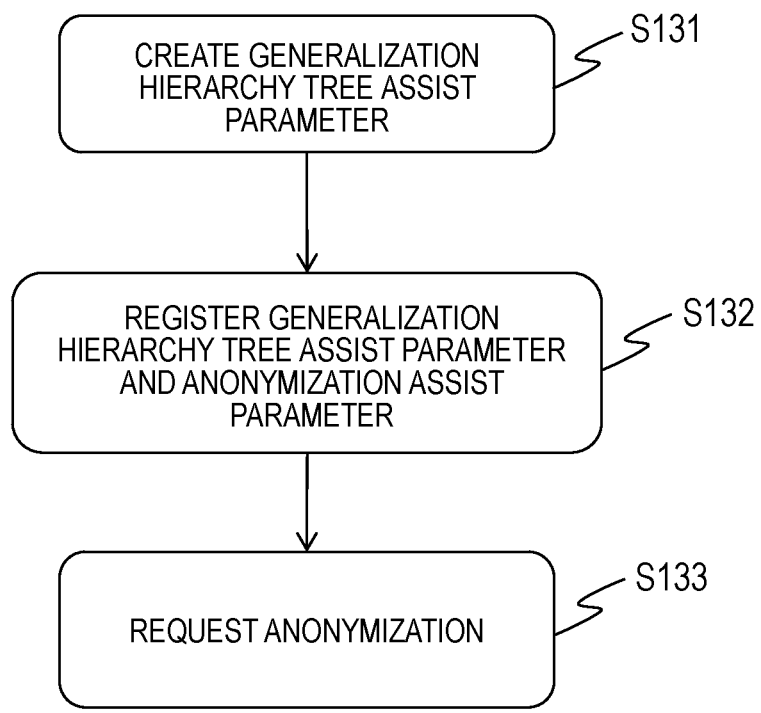
FIG. 8A is a flowchart for illustrating processing of requesting anonymization, which is executed by a registration PC in a second embodiment of this invention.

FIG. 8A is a flowchart for illustrating processing of requesting anonymization, which is executed by the registration PC 100 in the second embodiment of this invention.

Figure 8B:
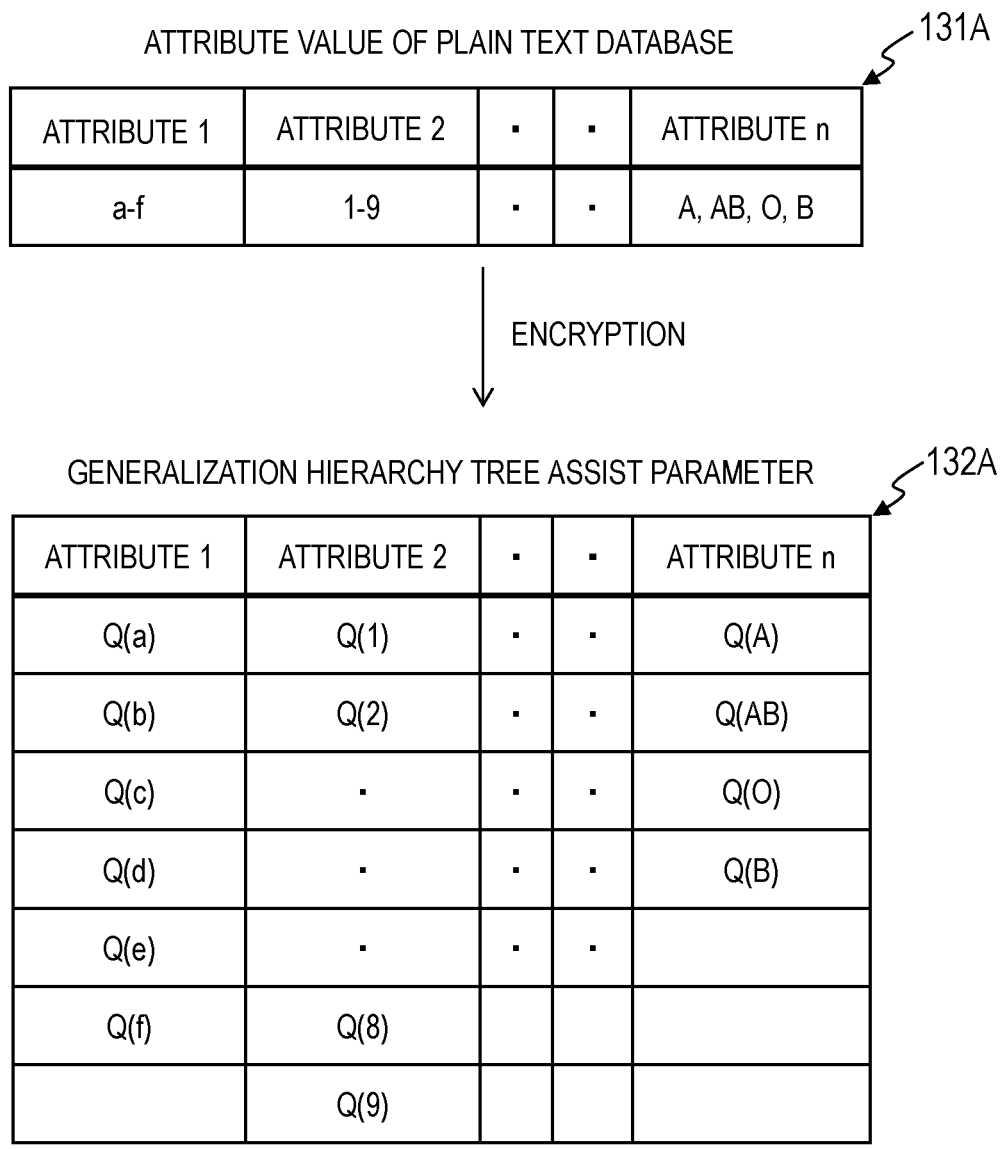
FIG. 8B is an explanatory diagram of creation of a generalization hierarchy tree assist parameter, which is executed by the registration PC in the second embodiment of this invention.

FIG. 8B is an explanatory diagram of creation of a generalization hierarchy tree assist parameter, which is executed by the registration PC 100 in the second embodiment of this invention.

Figure 8C:
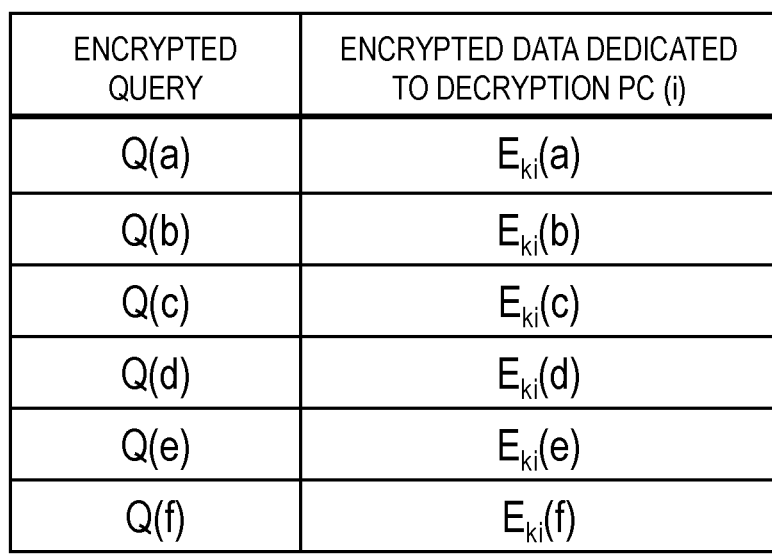
FIG. 8C is an explanatory diagram of a correspondence table between the encrypted query and encrypted data, which is generated by the registration PC in the second embodiment of this invention.

FIG. 8C is an explanatory diagram of the correspondence table between the encrypted query and encrypted data, which is generated by the registration PC 100 in the second embodiment of this invention.

The flow of requesting anonymization by the registration PC 100 is similar to that in the first embodiment. Instead of the processing (Step S121) of creating the encrypted generalization hierarchy tree in the flow illustrated in FIG. 5A, the registration PC 100 performs processing of creating a generalization hierarchy tree assist parameter, which is data for assisting creation of the generalization hierarchy tree (Step S131). For example, the registration PC 100 first extracts all the attribute values for each attribute of the plaintext database. An attribute value 131A of the plaintext database of FIG. 8B is an example of the attribute values, and contains a representative value ("a" to "f" in alphabetical order) of the attribute 1, a representative value (integers of from 1 to 9) of the attribute 2, and a representative value (blood type) of the attribute n.

Next, the registration PC 100 encrypts all the extracted representative values with the query encryption function of the searchable encryption, and sets those representative values as data for creation of the generalization hierarchy tree. A generalization hierarchy tree assist parameter 132A of FIG. 8B is an example of the data, and contains all the representative values of the attribute 1, the attribute 2, . . . , and the attribute n.

Next, the registration PC 100 registers the generalization hierarchy tree assist parameter 132A and the anonymization assist parameter 113 with the management server 200 via the network 400 (Step S132). Lastly, the registration PC 100 requests the management server 200 for anonymization (Step S133).

The anonymization assist parameter 113 contains a correspondence table for associating an encrypted query for retrieving the encrypted data without decryption and encrypted data obtained by encrypting the same plaintext data as the retrieved encrypted data using the encryption key for the decryption PC 300. In FIG. 8C, the correspondence table 133A obtained for the generalization hierarchy tree 112A is exemplified. In this example, the encrypted queries Q(a) to Q(f) are associated with pieces of encrypted data $E_{ki}(a)$ to $E_{ki}(f)$ for replacement, respectively.

The attribute value 131A of the plaintext database contains all the representative values of each attribute. However, the configuration may be modified so that the attribute value 131A contains only the values used in the plaintext database 111 or only specific values are extracted as the attribute value 131A.

Figure 9A:
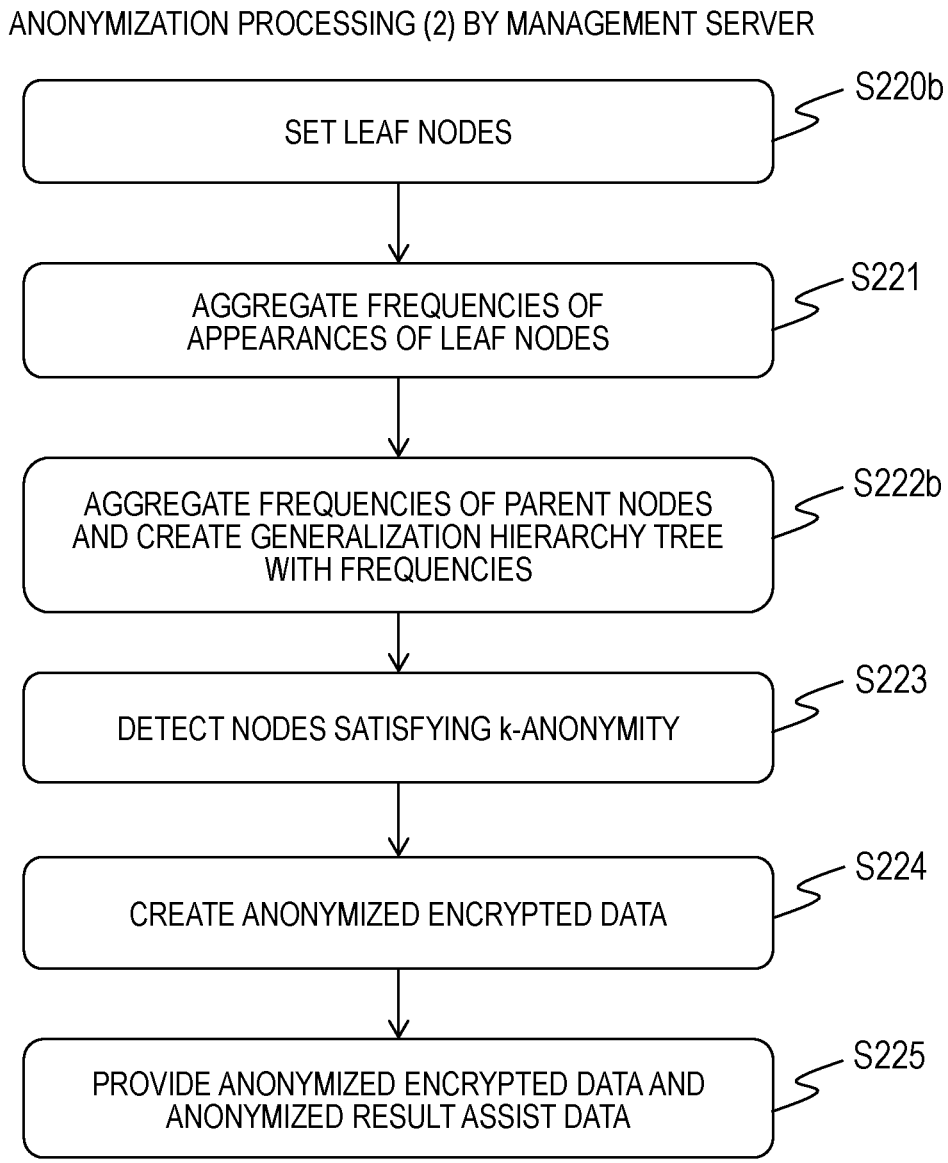
FIG. 9A is a flowchart for illustrating anonymization processing, which is executed by a management server in the second embodiment of this invention.

FIG. 9A is a flowchart for illustrating anonymization processing, which is executed by the management server 200 in the second embodiment of this invention.

Figure 9B:
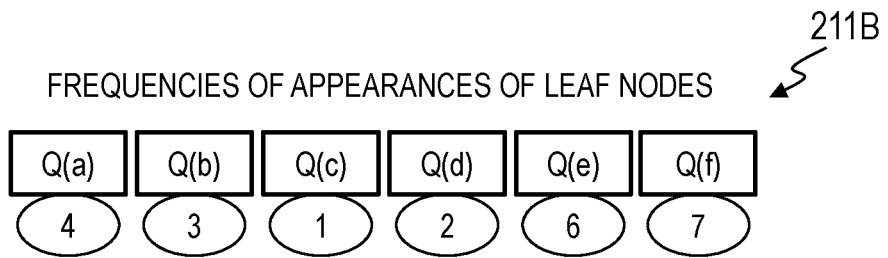
FIG. 9B is an explanatory diagram of frequencies of appearances of leaf nodes aggregated by the management server in the second embodiment of this invention.

FIG. 9B is an explanatory diagram of frequencies of appearances of leaf nodes aggregated by the management server 200 in the second embodiment of this invention.

Figure 9C:
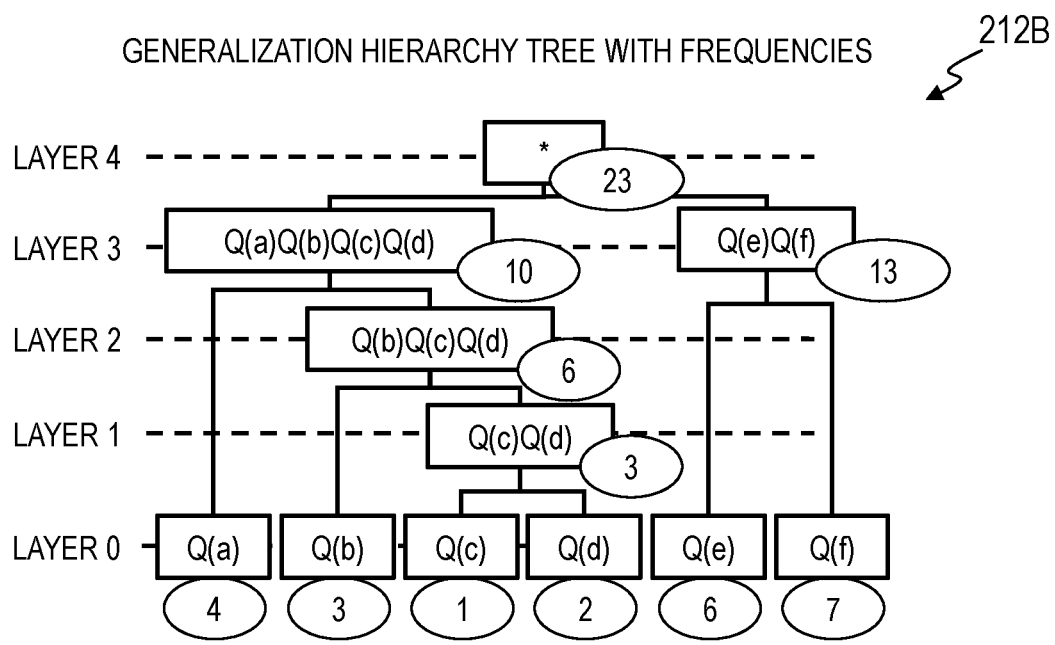
FIG. 9C is an explanatory diagram of a generalization hierarchy tree with frequencies, which is generated by the management server in the second embodiment of this invention.

FIG. 9C is an explanatory diagram of a generalization hierarchy tree with frequencies, which is generated by the management server 200 in the second embodiment of this invention.

First, with reference to FIG. 9A, a description is given of the anonymization processing by the management server 200. A difference from the flow in the first embodiment illustrated in FIG. 7A is addition of Step S220b and execution of Step S222b instead of Step S222. In the following, a description is given of Step S220b to Step S222b, which are differences from the anonymization processing by the management server 200 of FIG. 7A.

In Step S220b, the management server 200 retrieves data for creation of the generalization hierarchy tree for each attribute, and sets the data as the leaf nodes of the generalization hierarchy tree. For example, regarding the attribute 1, the management server 200 retrieves the encrypted queries Q(a) to Q(f) corresponding to the attribute 1 from the generalization hierarchy tree assist parameter 132A, and generates the leaf nodes of the generalization hierarchy tree from those queries, as illustrated in FIG. 9B.

In Step S221, the management server 200 follows the processing flow of FIG. 6 to store the frequencies of appearances of leaf nodes of the encrypted generalization hierarchy tree for all the attributes. With this, for example, the frequencies of appearances of leaf nodes of FIG. 9B are obtained.

In Step S222b, the management server 200 uses the frequencies of appearances of leaf nodes to sequentially create parent nodes, and finally creates a generalization hierarchy tree with frequencies. In the creation, the management server uses an evaluation function to create the generalization hierarchy tree with frequencies so that the score is optimal (or maximized or minimized).

A generalization hierarchy tree 212B with frequencies of FIG. 9C is an example of the generalization hierarchy tree created so that information entropy is maximized as an evaluation function. In this case, the created generalization hierarchy tree is a combination of child nodes having minimum frequencies of appearances so that the frequencies of appearances of parent nodes are minimized sequentially.

For example, in the example of the leaf node 211B of the generalization hierarchy tree illustrated in FIG. 9B, Q(a), Q(b), Q(c), Q(d), Q(e), and Q(f) are assigned with the frequencies of appearances of 4, 3, 1, 2, 6, and 7, respectively. Thus, the management server 200 combines Q(c) with the frequency of appearances of 1 and Q(d) with the frequency of appearances of 2 to create a parent node Q(c)Q(d) meaning Q(c) or Q(d). The parent node Q(c)Q(d) is assigned with 3, which is the sum of frequencies of appearances of Q(c) and Q(d).

Next, the management server 200 selects Q(b) with the minimum frequency of appearances of 3 from among the five nodes Q(a), Q(b), Q(c), Q(d), Q(e), and Q(f), which do not have parent nodes, and combines Q(b) and Q(c)Q(d) with the frequency of appearances of 3 to create a parent node Q(b)Q(c)Q(d) meaning Q(b), Q(c), or Q(d). The parent node Q(b)Q(c)Q(d) is assigned with 6, which is the sum of frequencies of appearances of Q(b) and Q(c)Q(d).

In this manner, the management server 200 creates parent nodes so that frequencies of appearances of those parent nodes become the minimum sequentially, and this processing is repeated until the number of relevant nodes becomes equal to or smaller than a predetermined number (2 in example of FIG. 9C).

In the example of FIG. 9C, the sum of frequencies of appearances of pieces of encrypted data retrieved through use of encrypted queries Q(a), Q(b), Q(c), and Q(d) is 10, whereas the sum of frequencies of appearances of pieces of encrypted data retrieved through use of encrypted queries Q(e) and Q(f) is 13, which means that both are equal to or larger than the k-value (e.g., 7). Thus, respective pieces of encrypted data (e.g., E(a), E(b), E(c), and E(d)) retrieved through use of the encrypted queries Q(a), Q(b), Q(c), and Q(d) are replaced with combinations of $E_{k1}(a)$, $E_{k1}(b)$, $E_{k1}(c)$, and $E_{k1}(d)$, which are pieces of encrypted data for replacement corresponding to the encrypted queries Q(a), Q(b), Q(c), and Q(d), respectively. Similarly, respective pieces of encrypted data (e.g., E(e), and E(f)) retrieved through use of the encrypted queries Q(e) and Q(f) are replaced with combinations of $E_{k1}(e)$ and $E_{k1}(f)$, which are pieces of encrypted data for replacement corresponding to the encrypted queries Q(e) and Q(f), respectively. Thus, for example, the encrypted data E(c) with the frequency of appearances of 1 is replaced with a combination of $E_{k1}(a)$, $E_{k1}(b)$, $E_{k1}(c)$, and $E_{k1}(d)$, to thereby achieve desired anonymization.

When there are nodes with the same frequency at the time of creation of a parent node in creation of the generalization hierarchy tree with frequencies, a selection method is given in advance. For example, nodes may be selected at random or in dictionary order. In any case, relevant nodes are always selected. Further, the layer of a parent node is set higher than that of its child node. For example, the layer of a parent node may be set one layer higher than that of its child node, or may be set to the same layer as that of another parent node when there is such a parent node. For example, in the generalization hierarchy tree 212B with frequencies illustrated in FIG. 9C, Q(e)Q(f), which is a parent node of Q(e) and Q(f), is set to the layer 3, which is the same layer as that of another parent node. However, Q(e)Q(f) may be changed to be set to the layer 4, or may be set to the layer 1 or the layer 2.

Step S223 to Step S225 are similar to processing in the first embodiment, and thus a description thereof is omitted here.

Through the processing described above, in the second embodiment, the registration PC 100 can request the management server 200 for anonymization processing without providing the management server 200 with an anonymized generalization hierarchy tree.

In the creation (Step S222b) of the generalization hierarchy tree with frequencies in the processing of aggregating frequencies of parent nodes and creating the generalization hierarchy tree with frequencies, the management server 200 in the second embodiment may adopt information entropy as an evaluation function, and use a compression technique such as Huffman coding or Hu-Tucker coding so that a loss of this information entropy is minimized, to thereby create the generalization hierarchy tree. Those techniques are described in detail in US 2013/0138698 A1.

Further, in the processing (Step S222b) of creating the generalization hierarchy tree with frequencies, the management server 200 may set a difference between the k-value and the frequency of appearances as an evaluation function to create the generalization hierarchy tree so as to optimize the evaluation function.

This invention is not limited to the embodiments described above, and encompasses various modification examples. For example, the embodiments have been described in detail for easier understanding of this invention, and this invention is not necessarily limited to a mode that includes all of the configurations described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

The components, functions, processing modules, processing measures, and the like described above may be implemented partially or entirely by hardware by, for example, designing the components and the like as an integrated circuit. The components, functions, and the like described above may also be implemented by software by interpreting and executing, with a processor, programs that implement the respective functions. The programs, tables, files, and other types of information for implementing the functions can be stored in a computer-readable non-transitory data storage medium such as a non-volatile semiconductor memory, or a hard disk drive, a solid state drive (SSD), or other storage device, or an IC card, an SD card, a DVD, or the like.

Further, the control lines and information lines considered to be required for the description are illustrated. It is not necessarily the case that all the control lines and information lines required for a product are illustrated. In actual practice, almost all the configurations may be considered as being connected to each other.

What is claimed is:

1. A data processing system, comprising a first computer, the first computer comprising:
a first processor; and
a first storage apparatus coupled to the first processor,
wherein the first storage apparatus is configured to hold:
a plurality of pieces of encrypted data generated by encrypting a plurality of pieces of plaintext data; and
a plurality of encrypted queries for retrieving the plurality of pieces of encrypted data without decryption, and
wherein the first processor is configured to:
search the plurality of pieces of encrypted data through use of each of the plurality of encrypted queries, to calculate a level of anonymity on the basis of a number of appearances of each of the plurality of pieces of encrypted data retrieved through the search; and
when the level of the anonymity does not satisfy a predetermined level of anonymity;
change at least two of the plurality of pieces of encrypted data retrieved through the search so as to satisfy the predetermined level of anonymity based on the number of appearances of the each of the plurality of pieces of the encrypted data retrieved through the search; and
output the plurality of pieces of encrypted data including the changed encrypted data.

2. The data processing system according to claim 1,
wherein the first storage apparatus is configured to hold assist information for associating each of the plurality of encrypted queries with a piece of encrypted data for replacement, which is used to replace each of the plurality of pieces of encrypted data retrieved through use of each of the plurality of encrypted queries,
wherein the assist information contains information for associating at least two encrypted queries with a piece of encrypted data for replacement, which is used to replace pieces of encrypted data retrieved through use of the at least two encrypted queries, and
wherein the first processor is configured to replace, when a number of appearances of a piece of encrypted data retrieved through use of any one of the at least two encrypted queries is smaller than a predetermined number, and a sum of numbers of appearances of pieces of encrypted data retrieved through use of the respective at least two encrypted queries is equal to or larger than the predetermined number, the pieces of encrypted data retrieved through use of the respective at least two encrypted queries with the piece of encrypted data for replacement associated to the at least two encrypted queries, to change the pieces of encrypted data so as to satisfy the predetermined level of anonymity.

3. The data processing system according to claim 2, further comprising a second computer coupled to the first computer via a network,
wherein the first computer further comprises a first communication apparatus coupled to the first processor and the network,
wherein the second computer comprises:
a second processor;
a second storage apparatus coupled to the second processor; and
a second communication apparatus coupled to the second processor and the network,
wherein the second storage apparatus is configured to hold:
the plurality of pieces of plaintext data;
a generalization hierarchy tree containing a plurality of nodes at a lowest layer, which correspond to a plurality of pieces of content capable of being taken by the plurality of pieces of plaintext data, and at least one node at a higher layer, which is coupled to a plurality of nodes at a lower layer and corresponds to all pieces of content of plaintext data corresponding to the plurality of nodes at the lower layer; and
a first encryption key and a second encryption key,
wherein the second processor is configured to:
generate the plurality of pieces of encrypted data by encrypting the plurality of pieces of plaintext data through use of the first encryption key;
generate a plurality of encrypted queries for retrieving the plurality of pieces of encrypted data without decryption through use of the first encryption key;
generate the plurality of pieces of encrypted data for replacement by performing encrypting one piece or a combination of the plurality of pieces of content of plaintext data corresponding to each of the plurality of nodes through use of the second encryption key;
generate the assist information containing information for associating, based on the generalization hierarchy tree, a plurality of encrypted queries for retrieving a plurality of pieces of encrypted data containing the plurality of pieces of content of plaintext data with the plurality of pieces of encrypted data for replacement, which are generated by encrypting the combination of the plurality of pieces of content of plaintext data; and
transmit the plurality of pieces of encrypted data, the plurality of encrypted queries, the plurality of pieces of encrypted data for replacement, and the assist information to the first computer, and
wherein the first processor is configured to store, into the first storage apparatus, the plurality of pieces of encrypted data, the plurality of encrypted queries, the plurality of pieces of encrypted data for replacement, and the assist information, which are received.

4. The data processing system according to claim 1,
wherein the first storage apparatus is configured to hold assist information for associating each of the plurality of encrypted queries with a piece of encrypted data for replacement, which is used to replace each of the plurality of pieces of encrypted data retrieved through use of each of the plurality of encrypted queries, and
wherein the first processor is configured to replace, when a number of appearances of a piece of encrypted data retrieved through use of a first encrypted query among the plurality of encrypted queries is smaller than a predetermined number, and a sum of numbers of appearances of pieces of encrypted data retrieved through use of the plurality of encrypted queries containing the first encrypted query is equal to or larger than the predetermined number, the pieces of encrypted data retrieved through use of the plurality of encrypted queries containing the first encrypted query with a combination of pieces of encrypted data for replacement corresponding to the plurality of encrypted queries containing the first encrypted query, to change the pieces of encrypted data so as to satisfy the predetermined level of anonymity.

5. The data processing system according to claim 4,
wherein the first processor is configured to generate a generalization hierarchy tree containing a plurality of nodes at a lowest layer, which correspond to the plurality of encrypted queries, and at least one node at a higher layer, which is coupled to a plurality of nodes at a lower layer and corresponds to all the plurality of encrypted queries corresponding to the plurality of nodes at the lower layer, in which each node is given, as a frequency of appearances of the each node, a sum of numbers of appearances of the pieces of encrypted data retrieved through use of all the plurality of encrypted queries corresponding to the each node, and
wherein the first processor is configured to replace each of at least one piece of encrypted data retrieved through use of all the plurality of encrypted queries corresponding to the node having the predetermined number or more of appearances with a combination of pieces of encrypted data for replacement corresponding to all the plurality of encrypted queries, to change the at least one piece of encrypted data so as to satisfy the predetermined level of anonymity.

6. The data processing system according to claim 4, further comprising a second computer coupled to the first computer via a network,
wherein the first computer further comprises a first communication apparatus coupled to the first processor and the network,
wherein the second computer comprises:
a second processor;
a second storage apparatus coupled to the second processor; and
a second communication apparatus coupled to the second processor and the network,
wherein the second storage apparatus is configured to hold the plurality of pieces of plaintext data, a first encryption key, and a second encryption key,
wherein the second processor is configured to:
generate the plurality of pieces of encrypted data by encrypting the plurality of pieces of plaintext data through use of the first encryption key;
generate a plurality of encrypted queries for retrieving the plurality of pieces of encrypted data without decryption through use of the first encryption key;
generate the plurality of pieces of encrypted data for replacement by encrypting a plurality of values capable of being taken by the plurality of pieces of plaintext data through use of the second encryption key;
generate the assist information containing information for associating an encrypted query for retrieving encrypted data corresponding to plaintext data of the same content with a piece of encrypted data for replacement; and
transmit the plurality of pieces of encrypted data, the plurality of encrypted queries, the plurality of pieces of encrypted data for replacement, and the assist information to the first computer, and
wherein the first processor is configured to store, into the first storage apparatus, the plurality of pieces of encrypted data, the plurality of encrypted queries, the plurality of pieces of encrypted data for replacement, and the assist information, which are received.

7. The data processing system according to claim 1,
wherein the first storage apparatus is configured to hold assist information for associating each of the plurality of encrypted queries with a piece of encrypted data for replacement, which is used to replace each of the plurality of pieces of encrypted data retrieved through use of each of the plurality of encrypted queries,
wherein the plurality of pieces of encrypted data contain data generated by encrypting the plurality of pieces of plaintext data through use of a first encryption key,
wherein the plurality of pieces of encrypted data for replacement contain:
a plurality of pieces of first encrypted data for replacement, which are generated by encrypting the plurality of pieces of plaintext data through use of a second encryption key; and
a plurality of pieces of second encrypted data for replacement, which are generated by encrypting the plurality of pieces of plaintext data through use of a third encryption key, and
wherein the first processor is configured to replace, when information for specifying any one of: the plurality of pieces of first encrypted data for replacement; and the plurality of pieces of second encrypted data for replacement is input, the plurality of pieces of encrypted data with the specified one of: the plurality of pieces of first encrypted data for replacement; and the plurality of pieces of second encrypted data for replacement, to change the plurality of pieces of encrypted data so as to satisfy the predetermined level of anonymity.

8. A data processing method to be executed by a computer system,
the computer system comprising a first computer,
the first computer comprising:
a first processor; and
a first storage apparatus coupled to the first processor,
the first storage apparatus being configured to hold:
a plurality of pieces of encrypted data generated by encrypting a plurality of pieces of plaintext data; and
a plurality of encrypted queries for retrieving the plurality of pieces of encrypted data without decryption,
the data processing method comprising:
a first step of searching, by the first processor, the plurality of pieces of encrypted data through use of each of the plurality of encrypted queries, to calculate a number of appearances of each of the plurality of pieces of encrypted data retrieved through the search; and
when the level of the anonymity does not satisfy a predetermined level of anonymity;
a second step of changing, by the first processor, when the level of the anonymity does not satisfy a predetermined level of anonymity, at least two of the plurality of pieces of encrypted data retrieved through the search so as to satisfy the predetermined level of anonymity based on the number of appearances of the each of the plurality of pieces of the encrypted data retrieved through the search; and
a third step of outputting, by the first processor, the plurality of pieces of encrypted data including the changed encrypted data.

9. The data processing method according to claim 8,
wherein the first storage apparatus is configured to hold assist information for associating each of the plurality of encrypted queries with a piece of encrypted data for replacement, which is used to replace each of the plurality of pieces of encrypted data retrieved through use of each of the plurality of encrypted queries,
wherein the assist information contains information for associating at least two encrypted queries with a piece of encrypted data for replacement, which is used to replace pieces of encrypted data retrieved through use of the at least two encrypted queries, and the second step comprises replacing, by the first processor, when a number of appearances of a piece of encrypted data retrieved through use of any one of the at least two encrypted queries is smaller than a predetermined number, and a sum of numbers of appearances of pieces of encrypted data retrieved through use of the respective at least two encrypted queries is equal to or larger than the predetermined number, the pieces of encrypted data retrieved through use of the respective at least two encrypted queries with the piece of encrypted data for replacement associated to the at least two encrypted queries, to change the pieces of encrypted data so as to satisfy the predetermined level of anonymity.

10. The data processing method according to claim 9, wherein the computer system further comprises a second computer coupled to the first computer via a network, wherein the first computer further comprises a first communication apparatus coupled to the first processor and the network, wherein the second computer comprises:
- a second processor;
- a second storage apparatus coupled to the second processor; and
- a second communication apparatus coupled to the second processor and the network, wherein the second storage apparatus is configured to hold:
- the plurality of pieces of plaintext data;
- a generalization hierarchy tree containing a plurality of nodes at a lowest layer, which correspond to a plurality of pieces of content capable of being taken by the plurality of pieces of plaintext data, and at least one node at a higher layer, which is coupled to a plurality of nodes at a lower layer and corresponds to all pieces of content of plaintext data corresponding to the plurality of nodes at the lower layer; and
- a first encryption key and a second encryption key, and wherein the data processing method further comprises:
- generating, by the second processor, the plurality of pieces of encrypted data by encrypting the plurality of pieces of plaintext data through use of the first encryption key;
- generating, by the second processor, a plurality of encrypted queries for retrieving the plurality of pieces of encrypted data without decryption through use of the first encryption key;
- generating, by the second processor, the plurality of pieces of encrypted data for replacement by performing encrypting one piece or a combination of the plurality of pieces of content of plaintext data corresponding to each of the plurality of nodes through use of the second encryption key;
- generating, by the second processor, the assist information containing information for associating, based on the generalization hierarchy tree, a plurality of encrypted queries for retrieving a plurality of pieces of encrypted data containing the plurality of pieces of content of plaintext data with the plurality of pieces of encrypted data for replacement, which are generated by encrypting the combination of the plurality of pieces of content of plaintext data;
- transmitting, by the second processor, the plurality of pieces of encrypted data, the plurality of encrypted queries, the plurality of pieces of encrypted data for replacement, and the assist information to the first computer; and
- storing, by the first processor, into the first storage apparatus, the plurality of pieces of encrypted data, the plurality of encrypted queries, the plurality of pieces of encrypted data for replacement, and the assist information, which are received.

11. The data processing method according to claim 8, wherein the first storage apparatus is configured to hold assist information for associating each of the plurality of encrypted queries with a piece of encrypted data for replacement, which is used to replace each of the plurality of pieces of encrypted data retrieved through use of each of the plurality of encrypted queries, and wherein the second step comprises replacing, by the first processor, when a number of appearances of a piece of encrypted data retrieved through use of a first encrypted query among the plurality of encrypted queries is smaller than a predetermined number, and a sum of numbers of appearances of pieces of encrypted data retrieved through use of the plurality of encrypted queries containing the first encrypted query is equal to or larger than the predetermined number, the pieces of encrypted data retrieved through use of the plurality of encrypted queries containing the first encrypted query with a combination of pieces of encrypted data for replacement corresponding to the plurality of encrypted queries containing the first encrypted query, to change the pieces of encrypted data so as to satisfy the predetermined level of anonymity.

12. The data processing method according to claim 11, further comprising generating, by the first processor, a generalization hierarchy tree containing a plurality of nodes at a lowest layer, which correspond to the plurality of encrypted queries, and at least one node at a higher layer, which is coupled to a plurality of nodes at a lower layer and corresponds to all the plurality of encrypted queries corresponding to the plurality of nodes at the lower layer, in which each node is given, as a frequency of appearances of the each node, a sum of numbers of appearances of the pieces of encrypted data retrieved through use of all the plurality of encrypted queries corresponding to the each node, wherein the second step comprises replacing, by the first processor, each of at least one piece of the encrypted data retrieved through use of all the plurality of encrypted queries corresponding to the node having the predetermined number or more of appearances with a combination of pieces of encrypted data for replacement corresponding to all the plurality of encrypted queries, to change the at least one piece of encrypted data so as to satisfy the predetermined level of anonymity.

13. The data processing method according to claim 11, wherein the computer system further comprises a second computer coupled to the first computer via a network, wherein the first computer further comprises a first communication apparatus coupled to the first processor and the network, wherein the second computer comprises:
- a second processor;
- a second storage apparatus coupled to the second processor; and
- a second communication apparatus coupled to the second processor and the network, wherein the second storage apparatus is configured to hold the plurality of pieces of plaintext data, a first encryption key, and a second encryption key, and wherein the data processing method further comprises:

generating, by the second processor, the plurality of pieces of encrypted data by encrypting the plurality of pieces of plaintext data through use of the first encryption key;

generating, by the second processor, a plurality of encrypted queries for retrieving the plurality of pieces of encrypted data without decryption through use of the first encryption key;

generating, by the second processor, the plurality of pieces of encrypted data for replacement by encrypting a plurality of values capable of being taken by the plurality of pieces of plaintext data through use of the second encryption key;

generating, by the second processor, the assist information containing information for associating an encrypted query for retrieving encrypted data corresponding to plaintext data of the same content with a piece of encrypted data for replacement;

transmitting, by the second processor, the plurality of pieces of encrypted data, the plurality of encrypted queries, the plurality of pieces of encrypted data for replacement, and the assist information to the first computer; and storing, by the first processor, into the first storage apparatus, the plurality of pieces of encrypted data, the plurality of encrypted queries, the plurality of pieces of encrypted data for replacement, and the assist information, which are received.

14. The data processing method according to claim 8, wherein the first storage apparatus is configured to hold assist information for associating each of the plurality of encrypted queries with a piece of encrypted data for replacement, which is used to replace each of the plurality of pieces of encrypted data retrieved through use of each of the plurality of encrypted queries, wherein the plurality of pieces of encrypted data contain data generated by encrypting the plurality of pieces of plaintext data through use of a first encryption key, wherein the plurality of pieces of encrypted data for replacement contain:
 a plurality of pieces of first encrypted data for replacement, which are generated by encrypting the plurality of pieces of plaintext data through use of a second encryption key; and
 a plurality of pieces of second encrypted data for replacement, which are generated by encrypting the plurality of pieces of plaintext data through use of a third encryption key, and wherein the second step comprises replacing, by the first processor, when information for specifying any one of: the plurality of pieces of first encrypted data for replacement; and the plurality of pieces of second encrypted data for replacement is input, the plurality of pieces of encrypted data with the specified one of: the plurality of pieces of first encrypted data for replacement; and the plurality of pieces of second encrypted data for replacement, to change the plurality of pieces of encrypted data so as to satisfy the predetermined level of anonymity.

15. The data processing system according to claim 1, wherein, when the level of the anonymity for does satisfy the predetermined level of anonymity for certain pieces of encrypted data, the certain pieces of encrypted data are not changed.

16. The data processing method according to claim 8, wherein, when the level of the anonymity for does satisfy the predetermined level of anonymity for certain pieces of encrypted data, the certain pieces of encrypted data are not changed.

* * * * *